(12) United States Patent
Okitsu

(10) Patent No.: US 6,188,800 B1
(45) Date of Patent: *Feb. 13, 2001

(54) TWO-DIMENSIONAL SPATIAL TRANSFORMATION SYSTEM FOR VIDEO PROCESSING

(75) Inventor: Hiromi Okitsu, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/922,727

(22) Filed: Aug. 27, 1997

(30) Foreign Application Priority Data

Aug. 30, 1996 (JP) .................................................. 8-230617
Aug. 30, 1996 (JP) .................................................. 8-230618

(51) Int. Cl.$^7$ ........................................................ G06K 9/36
(52) U.S. Cl. .......................... 382/276; 382/305; 345/436; 345/473; 348/580
(58) Field of Search .................................... 382/276, 277, 382/282, 284, 285, 286, 293, 305; 345/473, 502, 521, 126; 711/167, 209; 348/387, 526, 522, 531, 550, 575, 580, 523, 529, 578

(56) References Cited

U.S. PATENT DOCUMENTS

| | | | |
|---|---|---|---|
| 4,463,372 | | 7/1984 | Bennett et al. ....................... 348/580 |
| 4,908,874 | * | 3/1990 | Gabriel .................................. 382/41 |
| 5,119,080 | * | 6/1992 | Kajimoto et al. .................... 340/723 |
| 5,544,306 | * | 8/1996 | Deering et al. ...................... 395/164 |
| 5,546,530 | * | 8/1996 | Grimaud et al. ..................... 395/163 |
| 5,600,773 | * | 2/1997 | Vanover et al. ..................... 395/173 |
| 5,608,464 | * | 3/1997 | Woodham ............................ 348/578 |
| 5,715,385 | * | 2/1998 | Stearns et al. ....................... 395/136 |

* cited by examiner

Primary Examiner—Bhavesh Mehta
Assistant Examiner—Kanji Patel
(74) Attorney, Agent, or Firm—Pillsbury Madison & Sutro, LLP

(57) ABSTRACT

A two-dimensional spatial transformation system performs two-dimensional spatial transformation on an original video image in accordance with a two-pass method. Video data representing the original video image are input to a first video memory. Herein, a first pass transformation is performed on the original video image on the basis of transformation parameters used for a first pass, wherein the original video image is transformed to an intermediate video image with respect to a first direction (e.g., horizontal direction on a screen of a display). Video data representing the intermediate video image are transferred to a second video memory. A second pass transformation is performed on the intermediate video image on the basis of transformation parameters used for a second pass, wherein the intermediate video image is transformed to a transformed video image with respect to a second direction (e.g., vertical direction). The transformation parameters contain offset values and contraction rates. In the first pass transformation, the original video image is transformed such that a display location thereof is shifted by the offset value in the first direction while shape and size thereof are contracted by the contraction rate in the first direction. In the second pass transformation, the intermediate video image is transformed such that a display location thereof is shifted by the offset value in the second direction while shape and size thereof are contracted by the contraction rate in the second direction. Video data representing the transformed video image are output from the system. As a result, the system is capable of providing a variety of visual effects in video processing of video images. Incidentally, the video memories are configured by memory devices such as the DRAM and SRAM.

39 Claims, 22 Drawing Sheets

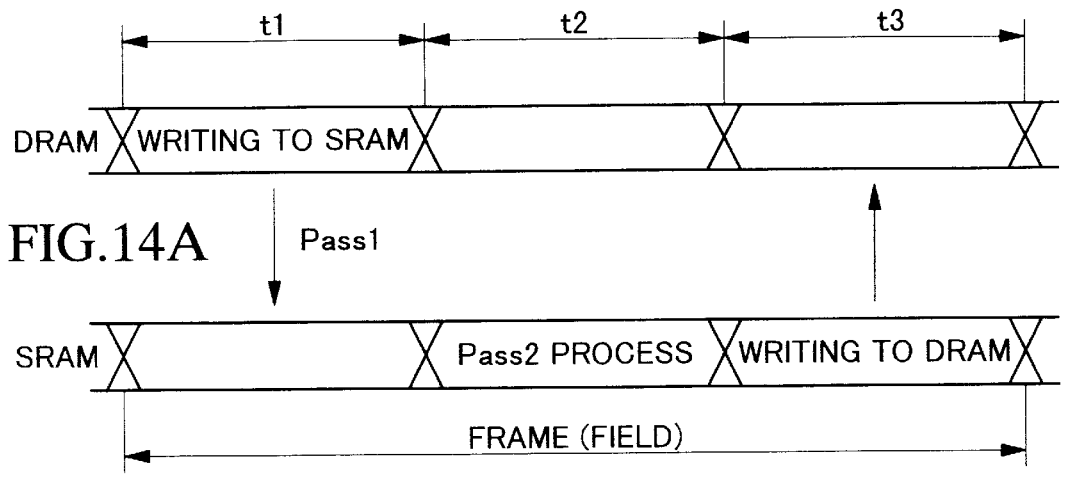
FIG.14A
FIG.14B
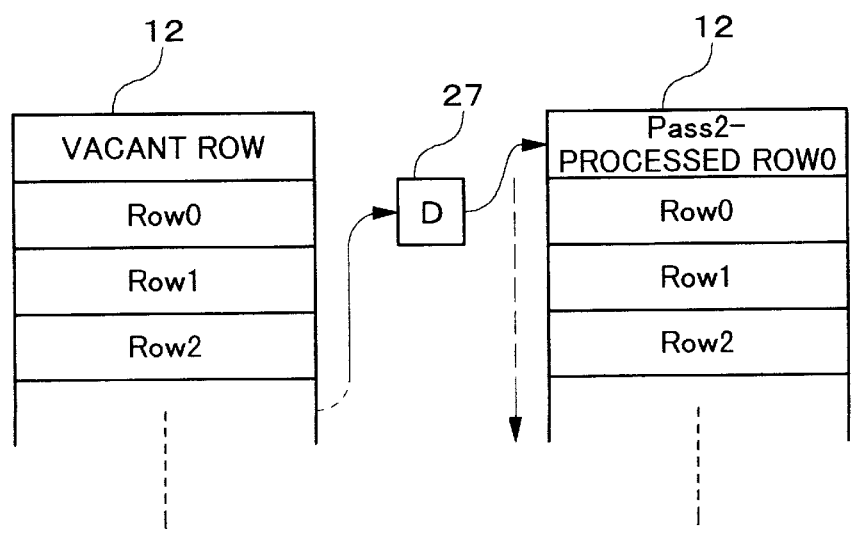
FIG.15

TWO-DIMENSIONAL SPATIAL TRANSFORMATION SYSTEM FOR VIDEO PROCESSING

BACKGROUND OF THE INVENTION

1. Field of the Invention

This invention relates to two-dimensional spatial transformation systems which perform two-dimensional spatial transformations on video images to provide special effects for video processing.

2. Prior Art

In computer graphics and video editing systems, original video images are frequently subjected to two-dimensional spatial transformation in a two-dimensional space of a video display to provide perspective effects as well as other special effects of graphics. The spatial transformation is fundamentally equivalent to the coordinates conversion process which is expressed by mathematical expressions as follows:

[Math 1]

$$[x, y, 1] = [u, v, 1] \cdot M$$

$$M = \begin{bmatrix} a11 & a12 & a13 \\ a21 & a22 & a23 \\ a31 & a32 & a33 \end{bmatrix}$$

In the above, numerals 'u' and 'v' denote two-dimensional coordinates values of an original video image before the transformation, whilst numbers 'x' and 'y' denote two-dimensional coordinates values of a video image after the transformation. In addition, 'M' denotes a transformation matrix. In the actual transformation of video images, an input pixel location (u, v) is calculated with respect to an output pixel (x, y). That is, the system performs a calculation process to sequentially produce input pixel locations with respect to output pixels respectively by solving a transformation matrix as follows:

[Math 2]

$$[u, v, 1] = [x, y, 1] \cdot M^{-1}$$

$$M^{-1} = \begin{bmatrix} A11 & A12 & A13 \\ A21 & A22 & A23 \\ A31 & A32 & A33 \end{bmatrix}$$

However, the above calculation method requires complicated calculations. This is a problem of the conventional system that the calculations are hard to be performed in real time. In addition, the above calculation method requires a two-dimensional filter for removing folding distortion which occurs due to sampling when transforming images to contract (or diminish). For this reason, there is a problem that the above calculation method requires a complicated configuration.

In order to solve the above problems, some papers such as the paper of U.S. Pat. No. 4,463,372 provide a so-called two-pass method which aims for reduction of the time of video processing. According to this method, operations of the two-dimensional spatial transformation are divided into two separate transformations which relate to two axes perpendicular to each other.

Next, a description will be given with respect to the two-pass method. Now, suppose that coordinates [x,y] is defined as follows:

[Math 3]

$$[x, y] = T(u,v) = [X(u,v), Y(u,v)]$$

The above equation is resolved into two passes by which transformations are performed with respect to x-axis and y-axis independently. So, calculations are sequentially performed with respect to the two passes.

[Math 4]

(First pass)

$$[x, v] = [Fv(u), v] \quad Fv(u) = X(u,v)$$

(Second pass)

$$[x, y] = [x, Gx(v)] \quad Gx(v) = Y(Hx(u), v)$$

When placing the above mathematical expressions of [Math 4] in [Math 1], it is possible to obtain mathematical equations of [Math 5] with respect to a value of 'x' and a value of 'y' as follows;

[Math 5]

(First pass)

$$x = \frac{a11u + a21v + a31}{a13u + a23v + a33}$$

(Second pass)

$$y = \frac{[(a11a22 - a12a23)x + a12a21 - a11a22]v + (a13a32 - a12a33)x + (a12a31 - a11a32)}{(a13a21 - a11a23)v + (a12a31 - a11a33)}$$

FIG. 26 shows an example of the video processing system employing the two-dimensional spatial transformation according to the two-pass method.

Video signals representing an original video image are input to a terminal of "Video In". The video signals are written into a first bank of a video memory 51, having a double-buffer configuration, in accordance with a write address WA0 output from a synchronous address generator 54. Herein, the video signals are written into the first bank of the video memory 51 in real time in accordance with a normal scanning order. A second bank of the video memory 51 stores a video image of a previous field (or a previous frame). Data of the original video image are read from the video memory 51 in accordance with a read address RA1 of a first pass (Pass1) address generator 55. Then, the data of the original video image are written into a first bank of a video memory 52, having a double-buffer configuration, in accordance with a write address WA1 of a sequential scan generator 56. Herein, the data are sequentially written into the first bank of the video memory 52 in accordance with a normal scan order. A second bank of the video memory 52 stores an intermediate video image of a previous field (or a previous frame) after completion of the first pass. So, read/write operations are performed with respect to data of the intemediate video image. That is, the data of the intermediate video image are read from the video memory 52 in accordance with a read address RA2 output from a second pass (Pass2) address generator 57; then the data are written into an output buffer 53. Herein, the read/write operations of the data of the intermediate video image are performed simultaneouly with read/write operations of the data of the original video image with regard to the video memory 52. The output buffer 53 has a double-buffer configuration as well. Herein, data of a transformed video image are consecutively read from an output bank of the output buffer 53 in real time. The data of the transformed video image are output to a terminal "Video Out". Banks of the video memories 51, 52 and banks of the output buffer 53 are respectively changed over by each field or by each frame. So, read/write operations described above are performed in real time with respect to each field or each frame. The address generators 55 and 57 sequentially generate the read addresses RA1 and RA2 in accordance with the aforementioned calculation process of [Math 5].

The aforementioned two-dimensional spatial transformation of the two-pass method suffers from a problem as follows:

Normally, a dynamic random-access memory (i.e., DRAM) is used for the video memory. When using the DRAM, it is necessary to change over a row address with respect to each pixel at a vertical transformation mode. That is, a RAS cycle (where RAS is an abbreviation for 'Row Address Strobe') is required for each pixel. For this reason, much access time is required for the vertical transformation. Due to such a reason, it is impossible to perform high-definition image processing with respect to a large number of pixels.

In order to solve the above problem, it is possible to use a SRAM (i.e., static random-access memory) instead of the DRAM for the video memory. In general, however, the SRAM requires a higher cost than the DRAM. So, if the video memory is constructed to have a capability to store data of four frames, the system as a whole should require much cost. This is another problem that the conventional system suffers from.

In the conventional system employing the two-pass method, division calculations are required with respect to each pixel as shown in [Math 5]. So, the scale of the hardware of the conventional system becomes inevitably complicated to enable real-time calculations. For this reason, application of the aforementioned two-pass method is limited to the business use in the broadcasting stations, for example. Therefore, the conventional technology suffers from a problem that the two-dimensional spatial transformation system of the two-pass method is hard to be used in the home electronics.

SUMMARY OF THE INVENTION

It is an object of the invention to provide a two-dimensional spatial transformation system which is capable of performing high-speed image processing without increasing the cost thereof.

It is another object of the invention to provide a two-dimensional spatial transformation system which is capable of realizing real-time two-dimensional video transformation based on the two-pass method with a simple hardware configuration.

A two-dimensional spatial transformation system of this invention is designed to perform two-dimensional spatial transformation on an original video image in accordance with a two-pass method. Video data representing the original video image are inputted into a first video memory. Herein, a first pass transformation is performed on the original video image on the basis of transformation parameters used for a first pass, wherein the original video image is transformed into an intermediate video image with respect to a first direction (e.g., horizontal direction on a screen of a display). Video data representing the intermediate video image are transferred to a second video memory. A second pass transformation is performed on the intermediate video image on the basis of transformation parameters used for a second pass, wherein the intermediate video image is transformed into a transformed video image with respect to a second direction (e.g., vertical direction). Thus, video data representing the transformed video image are outputted from the system.

The transformation parameters containing offset values and contraction rates are stored in a transformation table in advance. In the first pass transformation, the original video image is transformed such that a display location thereof is shifted by the offset value in the first direction while shape and size thereof are contracted by the contraction rate in the first direction. In the second pass transformation, the intermediate video image is transformed such that a display location thereof is shifted by the offset value in the second direction while shape and size thereof are contracted by the contraction rate in the second direction. Contents of the transformation table can be rewritten using vertical blanking periods of video signals. Thus, it is possible to provide real-time variations of the transformed video image.

Further, the system contains a function to detect a border area which is placed outside of a range of a video image on the screen of the display. Herein, an area color is implanted in the border area.

As a result, the system is capable of providing a variety of visual effects in video processing of video images such as animated video images. Incidentally, the video memories are configured by memory devices such as the DRAM and SRAM.

BRIEF DESCRIPTION OF THE DRAWINGS

These and other objects of the subject invention will become more fully apparent as the following description is read in light of the attached drawings wherein:

FIGS. 14A and 14B are time charts showing functions of video memories which are changed over in accordance with the video transformation process;

FIG. 15 is a block diagram showing storage areas of a second video memory which are configured to avoid overwriting of data;

DESCRIPTION OF THE PREFERRED EMBODIMENTS

Before describing the preferred embodiments of the invention, a description will be given with respect to an example of image processing realizing the two-dimensional spatial transformation according to the two-pass method.

Figure 1A:
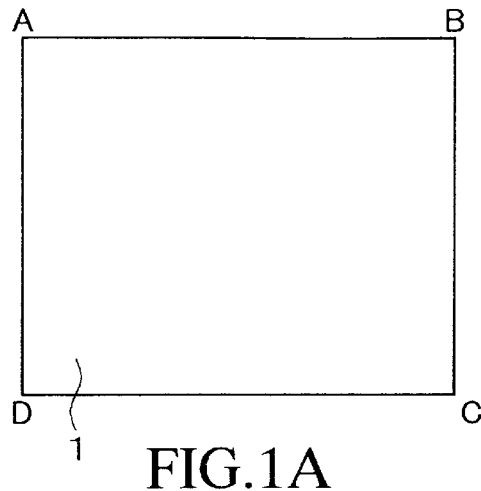
FIGS. 1A, 1B, 1C, 1D and 1E are drawings which are used to explain transformation processes for video images.
Figure 1B:
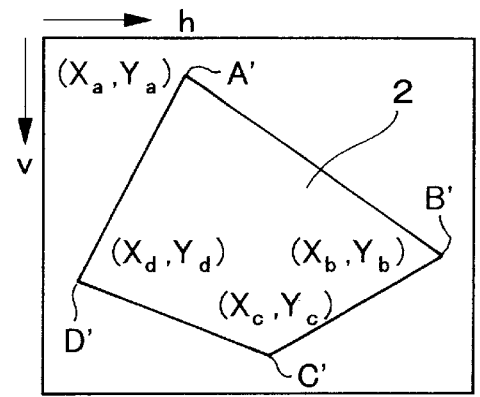

FIGS. 1A to 1E show procedures of the so-called "bilinear transformation" which provides transformation of an original video image by moving its corner positions to positions arbitrarily selected on a two-dimensional space of a video display. FIG. 1A shows an original video image 1 of a rectangular shape having four corners A, B, C and D. The bilinear transformation provides a transformed video image of A'B'C'D' (see FIG. 1B) based on the original video image 1 of ABCD. Herein, information regarding the bilinear transformation is given by coordinates values of transformed corner positions A', B', C' and D', i.e., (xa, ya), (xb, yb), (xc, yc) and (xd, yd). Based on the above coordinates values, the bilinear transformation is executed by sequentially performing two steps (i.e., first pass and second pass). Herein, the first pass represents a first-axis transformation process by which a video image is transformed from FIG. 1C to FIG. 1D, whilst the second pass represents a second-axis transformation process by which a video image is transformed from FIG. 1D to FIG. 1E.

(1) First Pass

Figure 1C:
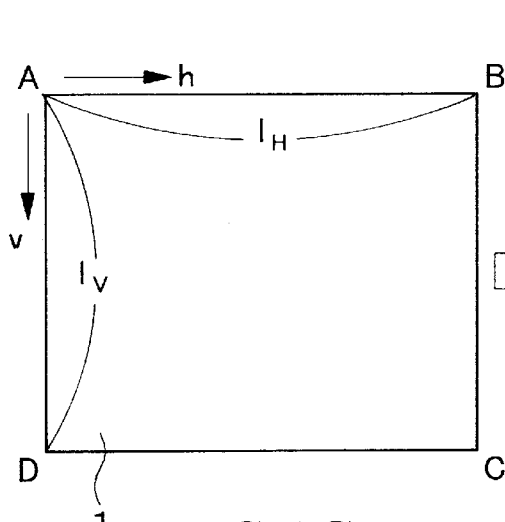
Figure 1D:
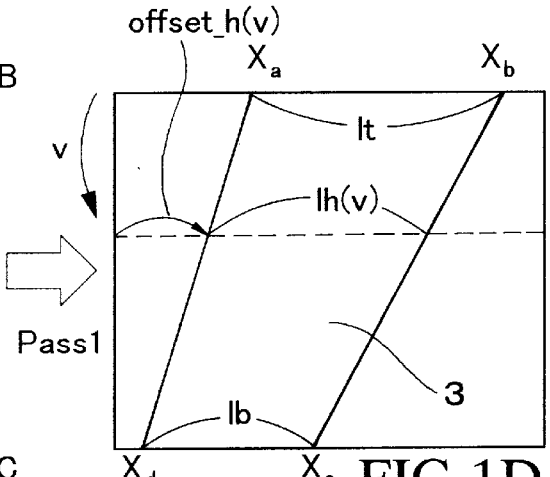

In the first pass, the original video image 1 of FIG. 1C is transformed to an intermediate video image 3 of FIG. 1D. Herein, the original video image 1 constructed by the four corners A, B, C and D is firstly subjected to transformation in a direction of a h-axis only. In FIG. 1C, a horizontal length of the original video image 1 is represented by "lH", whilst a vertical length is represented by "lV". An offset value "offset_h(v)" is provided to indicate a position to start plotting of pixels corresponding to the original video image 1 with respect to each of horizontal lines. A ratio is calculated between a horizontal width of the original video image 1 (i.e., horizontal length lH) and a horizontal width of an intermediate video image 3 (see FIG. 1D). This ratio is called a contraction rate "r_h(v)". The above values are realized by mathematical expression of [Math 6], as follows:

[Math 6]

$$\text{offset\_}h(v) = xa + \frac{(xd - xa)v}{lV}$$

$$r\_h(v) = \frac{lH}{lh(v)} = \frac{lV \cdot lH}{lt \cdot lV + (lb - lt)v}$$

In the above, "lt" represents a width of the intermediate video image at an upper end; "lb" represents a width of the intermediate video image at a lower end. In addition, "lh(v)" represents a width of the intermediate video image at a height "v" from the upper end.

The system calculates values representing the offset value offset_h(v) and contraction rate r_h(v) with respect to each of selected heights "v". Then, the calculated values are collected to form a table like Table 1, as follows:

TABLE 1

| v | offset_h(v) | r_h(v) |
|---|---|---|
| 0 | 20.0 | 1.714 |
| 1 | 19.7 | 1.724 |
| 2 | 19.4 | 1.734 |
| 3 | 19.1 | 1.744 |
| 4 | 18.8 | 1.754 |
| 5 | 18.5 | 1.764 |
| : | : | : |
| : | : | : |
| lV-1 | 5.0 | 2.400 |

Figure 2:
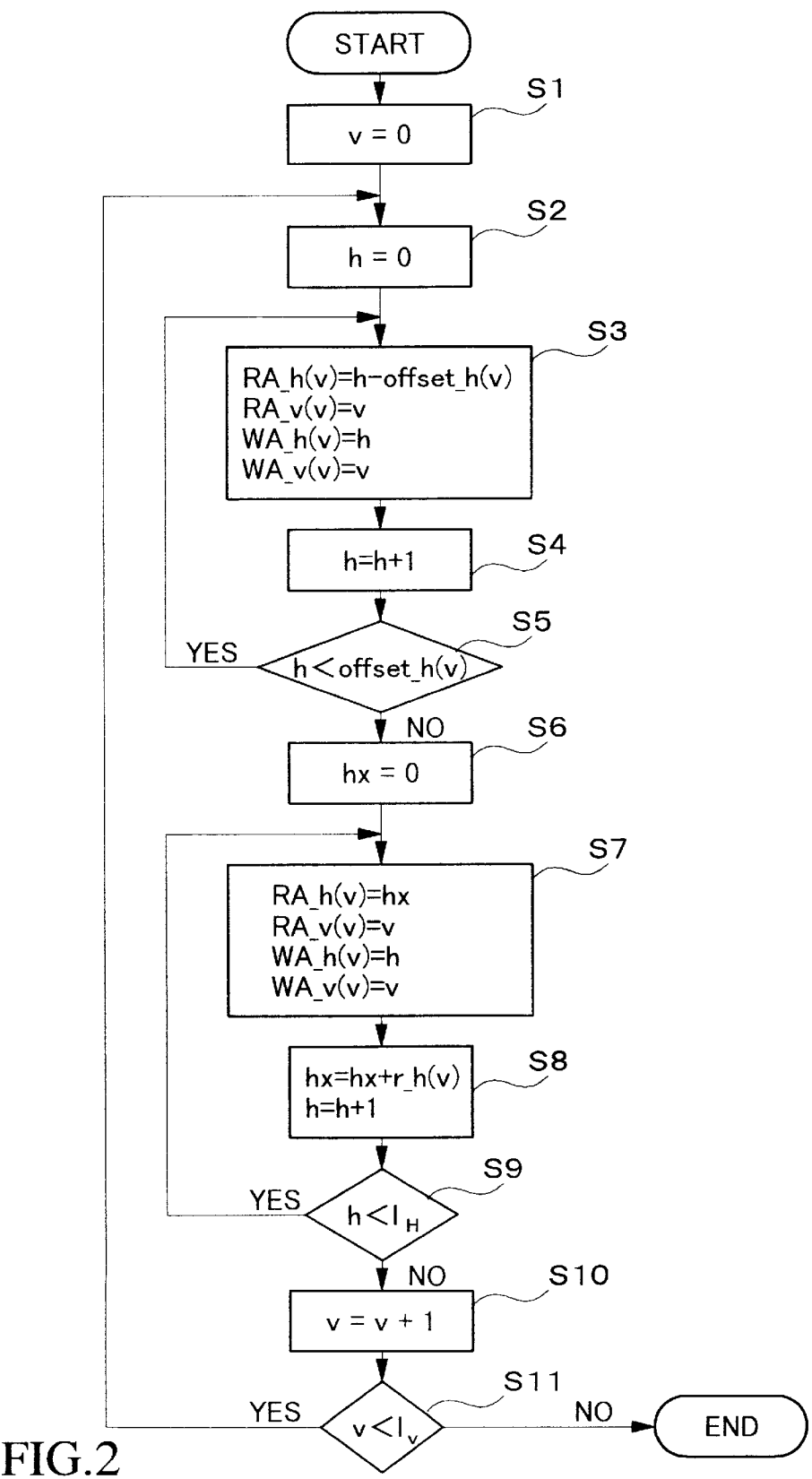
FIG. 2 is a flowchart showing procedures of two-dimensional spatial transformation.
Figure 3A:
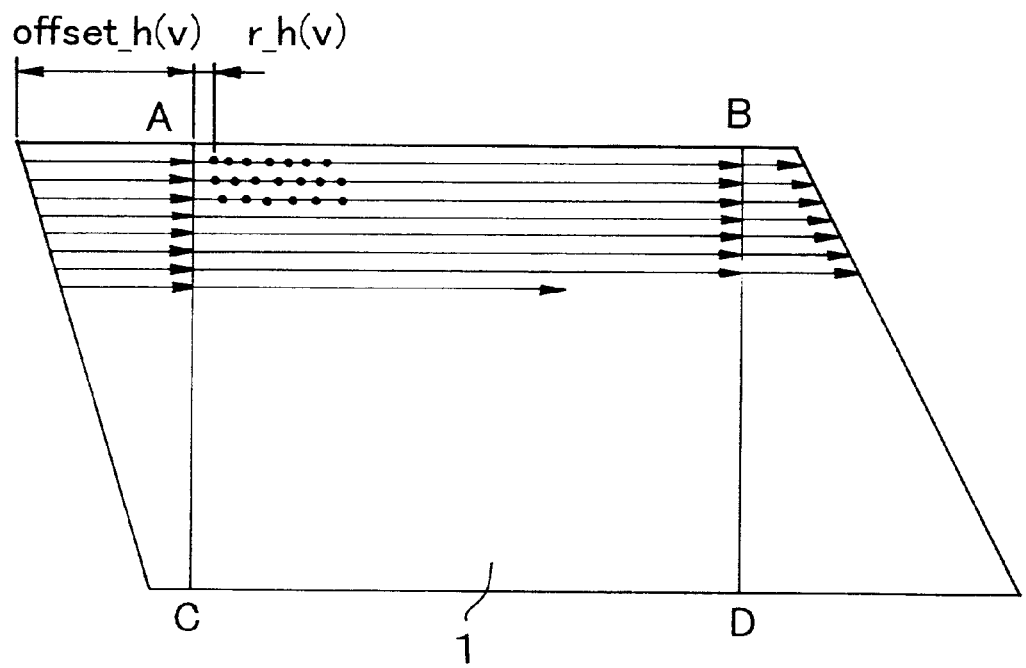
FIGS. 3A and 3B are drawings which are used to explain a first pass transformation process.
Figure 3B:
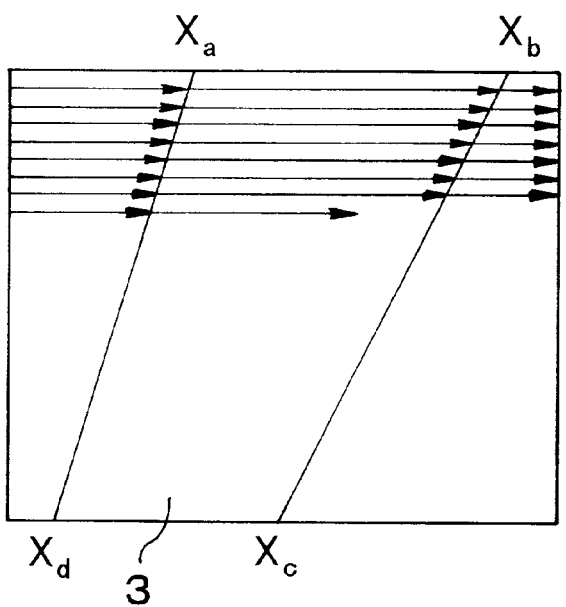

At transformation of a video image, a first pass transformation is executed by carrying out a transformation process of FIG. 2 that sequentially creates the read address RA and the write address WA. In FIG. 2, a vertical address v is increased from '0' to 'lV−1' in steps S1, S10 and S11. Herein, a horizontal address h is increased from '0' to 'lH−1' in steps S2, S4, S8 and S9 with respect to each value of the vertical address v which is increased. Until the horizontal address h reaches the offset value offset_h(v) (step S5), the system reads pixel data of a read address [h-offset_h(v), v] from the first memory storing the original video image. Then, the read pixel data are written into the second memory at a write address [h, v] (step S3). Herein, the pixel data correspond to video data representing a portion of a video image which is placed outside of the original video image 1 in a horizontal direction. FIGS. 3A and 3B show a series of the operations described above. When the system detects in step S5 that the horizontal address h reaches the offset value offset_h(v), the system proceeds to a series of steps as follows:

Every time the horizontal address h increases by '1', the contraction rate r_h(v) is accumulated as 'hx' (steps S6, S8), so that the read address is set to [hx, v] (step S7).

Thus, data of the original video image are sequentially read out with equal spacings each corresponding to the contraction rate r_h(v), so that they are disposed on horizontal lines as shown in FIG. 3A. Then, a video image corresponding to the read data is contracted in a horizontal direction to form an intermediate video image 3 shown in FIG. 3B. Data of the intermediate video image are stored in the second memory. As described above, the first pass transformation is executed by a subtraction process and an accumulation process only.

(2) Second Pass

Figure 1E:
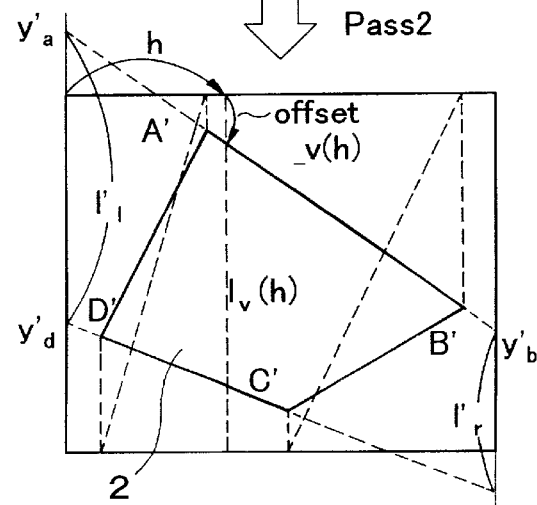

The second pass is fundamentally reverse to the first pass with respect to horizontal and vertical directions. That is, the first pass proceeds in a horizontal direction, whilst the second pass proceeds in a vertical direction. In the second pass, the intermediate video image 3 which is produced by the first pass is subjected to transformation in a v-axis direction only. Herein, the second pass requires transformation parameters which are calculated by performing corrections on the first pass transformation. FIG. 1E shows a transformed video image 2 within a two-dimensional space having a rectangular shape. The transformed video image 2 consists of four corners A', B', C' and D'. A line A'-B' is extended in a horizontal direction to cross two sides of the two-dimensional space with y-axis coordinates of ya' and yb'. Similarly, a line C'-D' is extended in a horizontal direction to cross the two sides of the two-dimensional space with y-axis coordinates of yc' and yd'. Those y-axis coordinates are calculated by mathematical equations of [Math 7], as follows:

[Math 7]

$$ya' = ya - a \cdot xa$$
$$yb' = a \cdot lH + b$$
$$yc' = c \cdot lH + d$$
$$yd' = yd - c \cdot xd$$

where $a = (ya - yb)/(xa - xb)$ $$b = yb - a \cdot xb$$
$$c = (yd - yc)/(xd - xc)$$
$$d = yc - c \cdot xc$$

If mathematical expressions of ll'=yd'−ya' and lr'=yc'−yb' are introduced to the above equationas, the offset value offset_v(h) and the contraction rate r_v(h) with respect to each of vertical lines can be expressed by [Math 8], as follows:

[Math 8]

$$\text{offset\_}v(h) = ya' + \frac{(yb' - ya')h}{lH}$$

$$r\_v(h) = \frac{lV}{lv(h)} = \frac{lV \cdot lH}{ll' \cdot lH + (lr' - ll')h}$$

In accordance with the above equations, the offset value offset_v(h) and the contraction rate r_v(h) are calculated with respect to each value of 'h'. Then, the calculated values are collected to form a table like Table 2, as follows:

TABLE 2

| h | offset_v(h) | r_v(h) |
|---|---|---|
| 0 | −9.3 | 1.182 |
| 1 | −8.6 | 1.191 |
| 2 | −7.9 | 1.200 |
| 3 | −7.1 | 1.209 |
| 4 | −6.4 | 1.219 |
| 5 | −5.7 | 1.228 |
| : | : | : |
| : | : | : |
| 1H-1 | 33.6 | 2.134 |

Figure 4A:
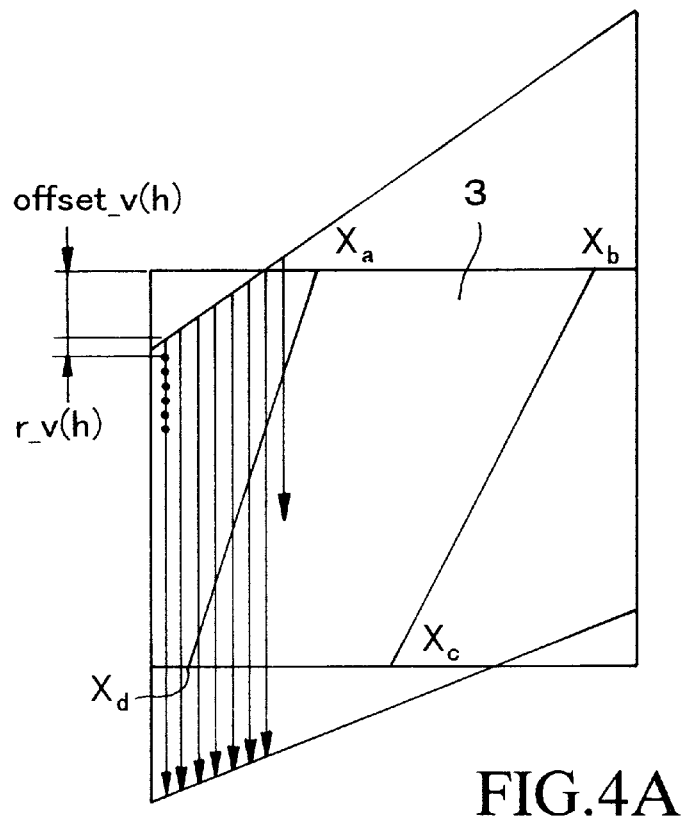
FIGS. 4A and 4B are drawings which are used to explain a second pass transformation process.
Figure 4B:
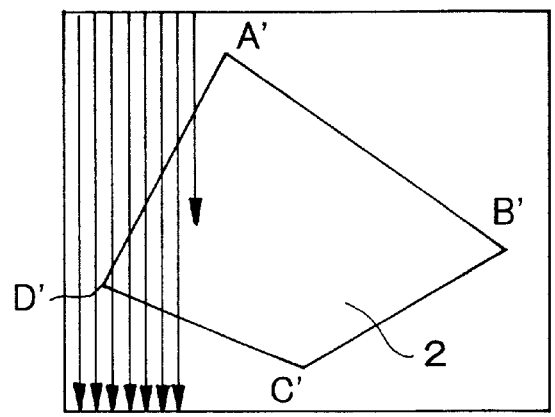

The transformation process of the second pass can be carried out as shown in FIGS. 4A and 4B. In contrast to the aforementioned transformation process of the first pass shown in FIGS. 3A and 3B, the transformation process of the second pass shown in FIGS. 4A and 4B proceeds in a vertical direction. So, in the transformation process of the second pass, the read address and write address are sequentially created with respect to the vertical direction.

Figure 5:
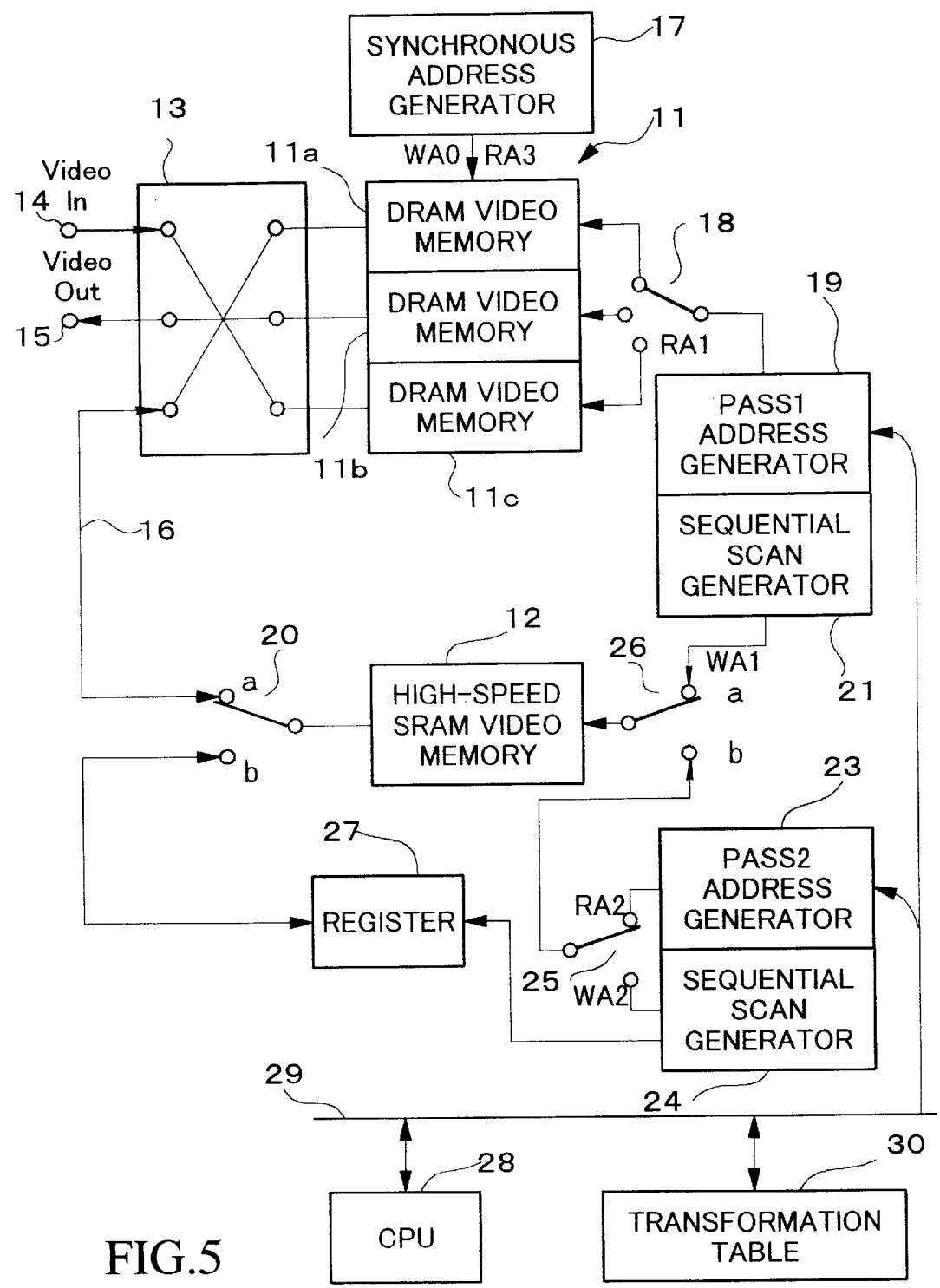
FIG. 5 is a block diagram showing a two-dimensional spatial transformation system which is designed in accordance with an embodiment of the invention.

FIG. 5 is a block diagram showing a two-dimensional spatial transformation system which is designed in accordance with an embodiment of the invention. Herein, the system of FIG. 5 employs the two-pass method.

The two-dimensional spatial transformation system contains a first video memory 11, configured by a DRAM, and a second video memory 12 configured by a high-speed SRAM. The first video memory 11 has a triple-buffer configuration which consists of three video memories 11a, 11b and 11c. Data terminals of the video memories 11a, 11b and 11c are connected to a switch 13, which in turn connects with a video input terminal (Video In) 14, a video output terminal (Video Out) 15 and a transformation bus 16. So, the switch 13 switches over connections of the video memories 11a–11c with the terminals 14, 15 and the bus 16 by each frame or by each field. A synchronous address generator 17 supplies the first video memory 11 with synchronous addresses WA0 and RA3. In addition, a first pass (Pass1) address generator 19 supplies a read address RA1 to the first video memory 11 via a switch 18.

A data transfer of video data is performed between the first video memory 11 and the second video memory 12, configured by the high-speed SRAM, via the switch 13 and transformation bus 16 as well as a switch 20. So, the video data are written into or read from the second video memory 12. A sequential scan generator 21 supplies a write address WA1 to the second video memory 12 via a switch 26. A switch 25 receives a read address RA2 output from a second pass (Pass2) address generator 23 as well as a write address WA2 output from a sequential scan generator 24. The switch 25 alternatively selects either the read address RA2 or the write address WA2 by each pixel. So, either the read address RA2 or the write address WA2 is supplied to the second video memory 12 via the switch 26. A data register 27 is used at a second pass transformation mode in which the system uses the second video memory 12. So, the data register 27 temporarily stores pixel data read from the second video memory 12. A central processing unit (CPU) 28 calculates transformation parameters which are used when the address generators 19 and 23 generate addresses. Being interrupted by vertical synchronizing pulses of video signals, the CPU 28 accesses a RAM via a bus 29 to form a transformation table 30 for storing the transformation parameters. To enable easy generation of the read addresses RA1, RA2, the present embodiment uses new offset values offset'_h(v) and offset'_v(h) instead of the aforementioned offset values offset_h(v) and offset_v(h). Herein, the new offset values offset'_h(v) and offset'_v(h) are produced by multiplying the offset values offset_h(v) and offset_v(h) by the contraction rates r_h(v) and r_v(h) respectively. Contents of the transformation table 30 storing the transformation parameters are shown by Tables 3 and 4. Herein, Table 3 corresponds to Table 1 while Table 4 corresponds to Table 2.

TABLE 3

| v | offset'_h(v) | r_h(v) |
|---|---|---|
| 0 | 34.3 | 1.714 |
| 1 | 34.0 | 1.724 |
| 2 | 33.6 | 1.734 |

TABLE 3-continued

| v | offset'_h(v) | r_h(v) |
|---|---|---|
| 3 | 33.3 | 1.744 |
| 4 | 33.0 | 1.754 |
| 5 | 32.6 | 1.764 |
| ⋮ | ⋮ | ⋮ |
| 1V-1 | 12.0 | 2.400 |

TABLE 4

| h | offset'_v(h) | r_v(h) |
|---|---|---|
| 0 | -11.0 | 1.182 |
| 1 | -10.2 | 1.191 |
| 2 | -9.4 | 1.200 |
| 3 | -8.6 | 1.209 |
| 4 | -7.8 | 1.219 |
| 5 | -7.0 | 1.228 |
| ⋮ | ⋮ | ⋮ |
| 1H-1 | 71.6 | 2.134 |

Figure 6:
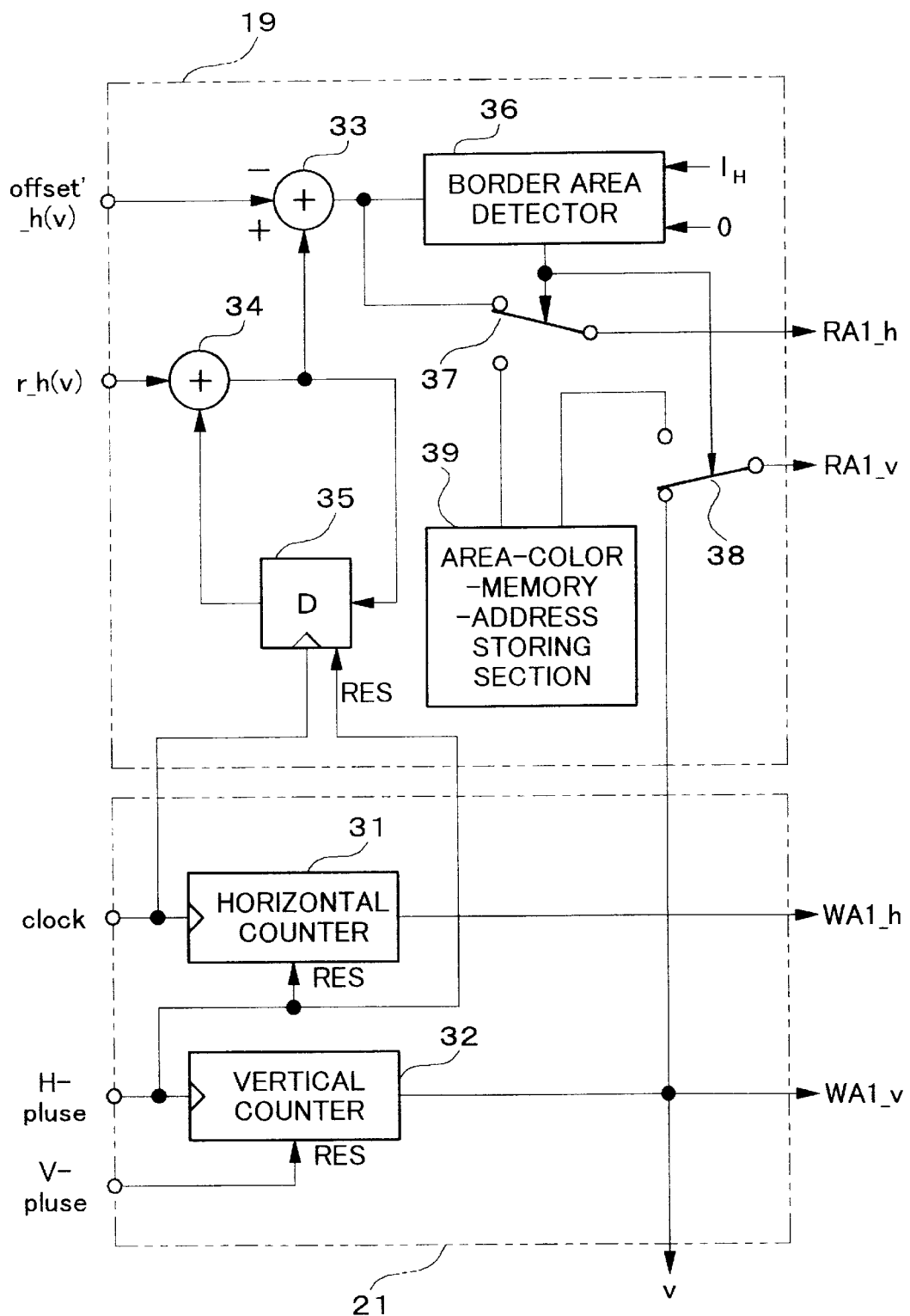
FIG. 6 is a block diagram showing internal configurations of first-pass-related parts of the system of FIG. 5.

FIG. 6 shows an example of internal configurations of the first pass address generator 19 and sequential scan generator 21.

The sequential scan generator 21 is configured by a horizontal counter 31 and a vertical counter 32. The horizontal counter 31 counts clock pulses of a reference clock signal "clock" to generate a horizontal write address WA1_h. The vertical counter 32 counts horizontal synchronizing pulses "H-pulse" to generate a vertical write address WA1_v. The horizontal counter 31 is reset by the horizontal synchronizing pulses H-pulse, whilst the vertical counter 32 is reset by vertical synchronizing pulses V-pulse. The sequential scan generator 21 outputs the vertical write address WA1_v as an address 'v' of the transformation table 30. In accordance with the address v, the offset value offset'_h(v) and contraction rate r_h(v) are read from the transformation table 30 and are supplied to the first pass address generator 19.

In the first pass address generator 19, the offset value offset'_h(v) read from the transformation table 30 is supplied to a negative input of a subtractor 33. A latch circuit 34 and an adder 35 configure an accumulative adder. After being reset by the horizontal synchronizing pulses H-pulse, the accumulative adder performs accumulative addition of the contraction rate r_h(v) in accordance with the reference clock signal. A result of the accumulative addition is supplied to a positive input of the subtractor 33. The subtractor 33 subtracts the offset value offset'_h(v) from the result of the accumulative addition of the contraction rate r_h(v). Then, an output of the subtractor 33 is provided as a horizontal read address RA1_h. However, as shown in FIGS. 3A and 3B, the output of the subtractor 33 ranges from negative values to values representing addresses which exceed the range of the original video image 1. So, it is necessary to perform a limit process on the output of the subtractor 33.

Figure 7:
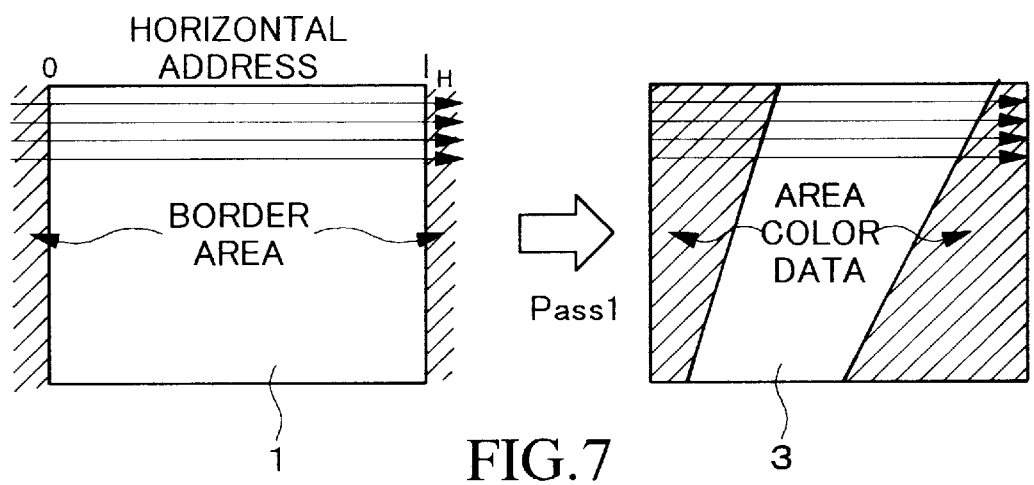
FIG. 7 shows video images subjected to first pass transformation to explain a border area process.
Figure 8:
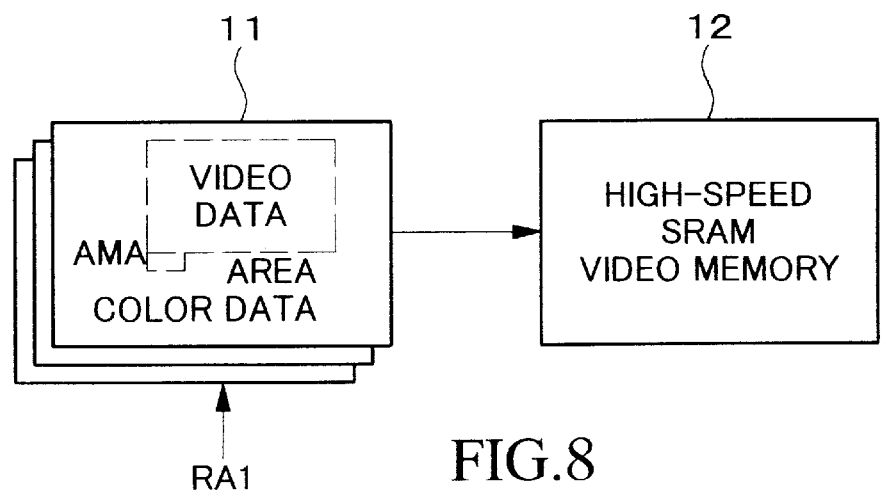
FIG. 8 shows configurations of video memories shown in FIG. 5.

FIG. 7 shows a result of the first pass transformation process that the original video image 1 is contracted to an intermediate video image 3. Herein, hatching parts show border areas which exist outside of the range of the original video image 1. If such border areas appear on an output video image of the system, a video editing device is used to perform video mixing. That is, an area color is implanted in the border areas. Such an area color is frequently used as a key signal for video composition. In general, chromakey is used as the key signal. A function to detect the border areas for implantation of the chromakey is required for the video mixing. Especially, such a function is very useful for the two-dimensional spatial transformation system of the present embodiment. The system of the present embodiment is capable of easily detecting the border areas under a condition where an output of the subtractor 33 is less than '0' or greater than '1H'. For this reason, area color data (or chromatic color data) are stored in advance in a storage area which is specified by a specific address AMA within the first video memory 11 (see FIG. 8). So, a write address WA1 which is generated when the system detects the border areas is changed over to the address of the first video memory 11 which stores the area color data. Thus, it is possible to implant the area color data in the border areas.

In the first pass address generator 19 shown in FIG. 6, an output of the subtractor 33 is input to a border area detector 36. Herein, a decision is made as to whether or not the output of the subtractor 33 belongs to a range of values between '0' and '1H-1'. If the output of the subtractor 33 belongs to the above range of values, the border area detector 36 controls switches 37 and 38 to contact with the subtractor 33 and the vertical counter 32 respectively. Thus, contacts of the switches 37 and 38 are set as shown in FIG. 6, wherein the output of the subtractor 33 is provided as a horizontal read address RA1_h via the switch 37; and an output of the vertical counter 32 is provided as a vertical read address RA1_v via the switch 38.

On the other hand, if the output of the subtractor 33 does not belong to the range of values between '0' and '1H-1', the border area detector 36 controls the switches 37 and 38 to contact with an area-color-memory-address storing section 39. So, the system reads out the address AMA of the first video memory 11 which stores the area color to be implanted in the border areas. Thus, the address AMA is output as both of the read addresses RA1_h and RA1_v.

As described above, the present embodiment employs an address change-over method which changes over addresses of the first video memory 11. As compared to a method that a switching circuit of chromakey is directly added to the pass of the video data, the above method has a variety of merits as follows:

When fabricating circuit elements of the present embodiment to form a LSI circuit, it is possible to avoid an increase of a number of input/output pins for video data. In addition, it is possible to reduce cost of a LSI package.

As described above, the present embodiment has a function to perform an address transformation process, content of which can be summarized as follows:

As shown in FIG. 3A, the system performs implantation of the area color data until the read addresses sequentially generated reach a range of addresses which define a storage area of the original video image 1 in the first video memory 11. After the read addresses reach the range of addresses defining the storage area of the original video image 1, the system sequentially reads out video data with intervals corresponding to the contraction rate r_h(v). Then, the video data are written into the second video memory 12 with "standard" intervals. Thus, it is possible to produce the intermediate video image 3 which is transformed in a horizontal direction as shown in FIGS. 3A and 3B. Herein, formation of the intermediate video image is started at a position which deviates from the range of the original video image 1 by the offset value offset_h(v). As compared with the original video image 1, the intermediate video image 3 is contracted in a horizontal direction by a ratio defined by the contraction rate r_h(v).

Figure 9:
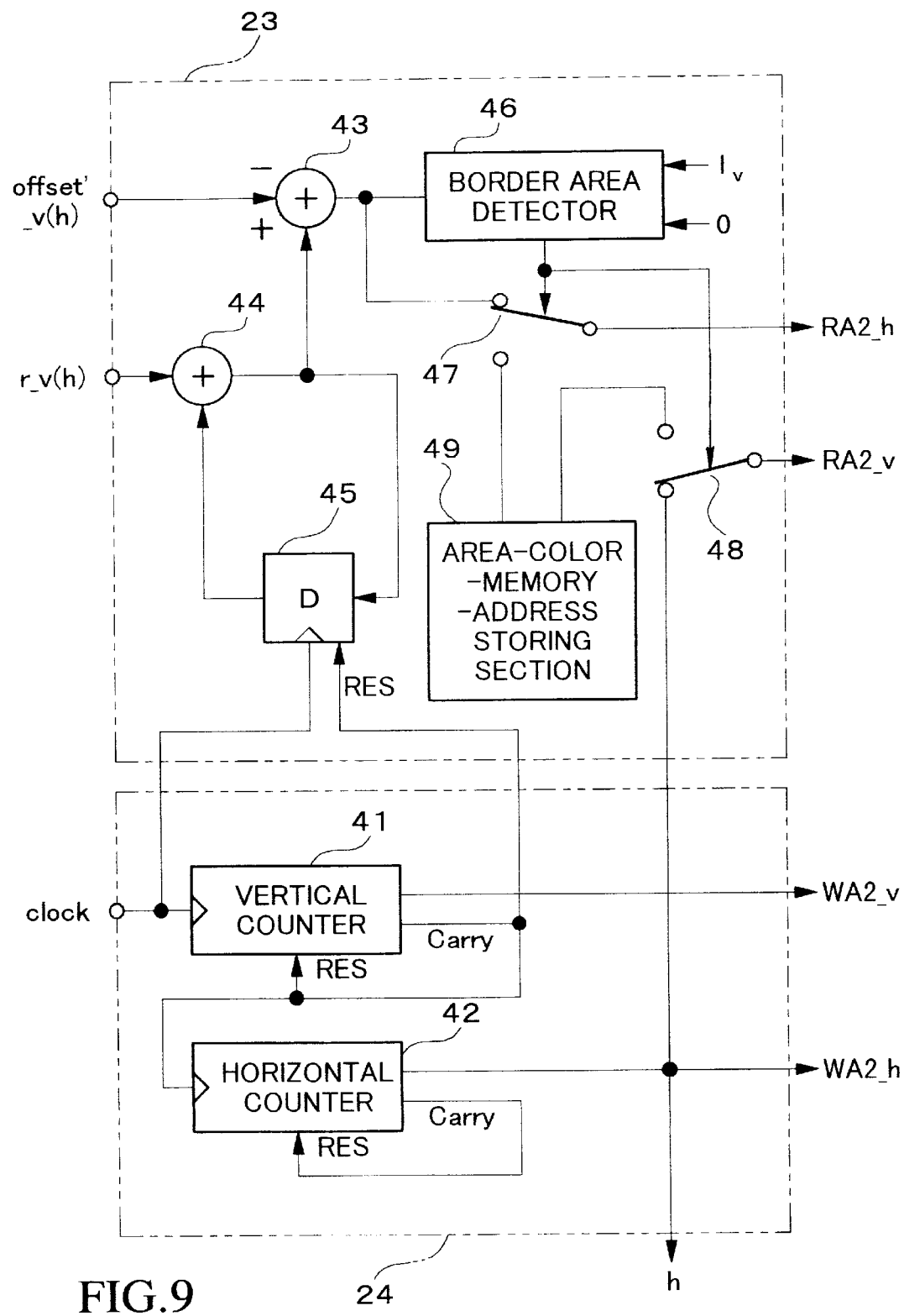
FIG. 9 is a block diagram showing internal configurations of second-pass-related parts of the system of FIG. 5.

Internal configurations of the second pass address generator 23 and sequential scan generator 24 are basically equivalent to the internal configurations of the first pass address generator 19 and sequential scan generator 21 shown in FIG. 6. However, the sequential scan generator 24 is modified as shown in FIG. 9 because the second pass transformation performs scanning in a vertical direction. In the sequential scan generator 24 shown in FIG. 9, the reference clock signal 'clock' is input to a vertical counter 41 to generate a vertical write address WA2_v. In addition, a carry signal 'Carry' of the vertical counter 41 is input to a horizontal counter 42 to generate a horizontal write address WA2_h. In the second pass address generator 23, an adder 44 and a latch circuit 45 are combined together to form an accumulative adder which performs accumulative addition of the contraction rate r_v(h). A subtractor 43 subtracts the offset value offset'_v(h) from a result of the accumulative addition of the contraction rate r_v(h). Based on an output of the subtractor 43, a border area detector 46 performs detection of border areas. Based on a result of the detection, the border area detector 46 switches over switches 47 and 48. Thus the second pass address generator 23 provides read addresses as follows:

In a range of the border area, an output of a area-color-memory-address storing section 49 is provided as read addresses RA2_h and RA2_v. Outside of the range of the border area, the output of the subtractor 43 is provided as the vertical read address RA2_v, whilst an output of the horizontal counter 42 is provided as the horizontal read address RA2_h.

As a result of the second pass transformation process described above, it is possible to obtain the transformed video image 2 which is transformed in a vertical direction as shown in FIGS. 4A and 4B. Herein, formation of the transformed video image is started at a position which deviates from a range of the intermediate video image 3 by the offset value. As compared with the intermediate video image 3, the transformed video image 2 is contracted by the contraction rate in a vertical direction.

Figure 10:
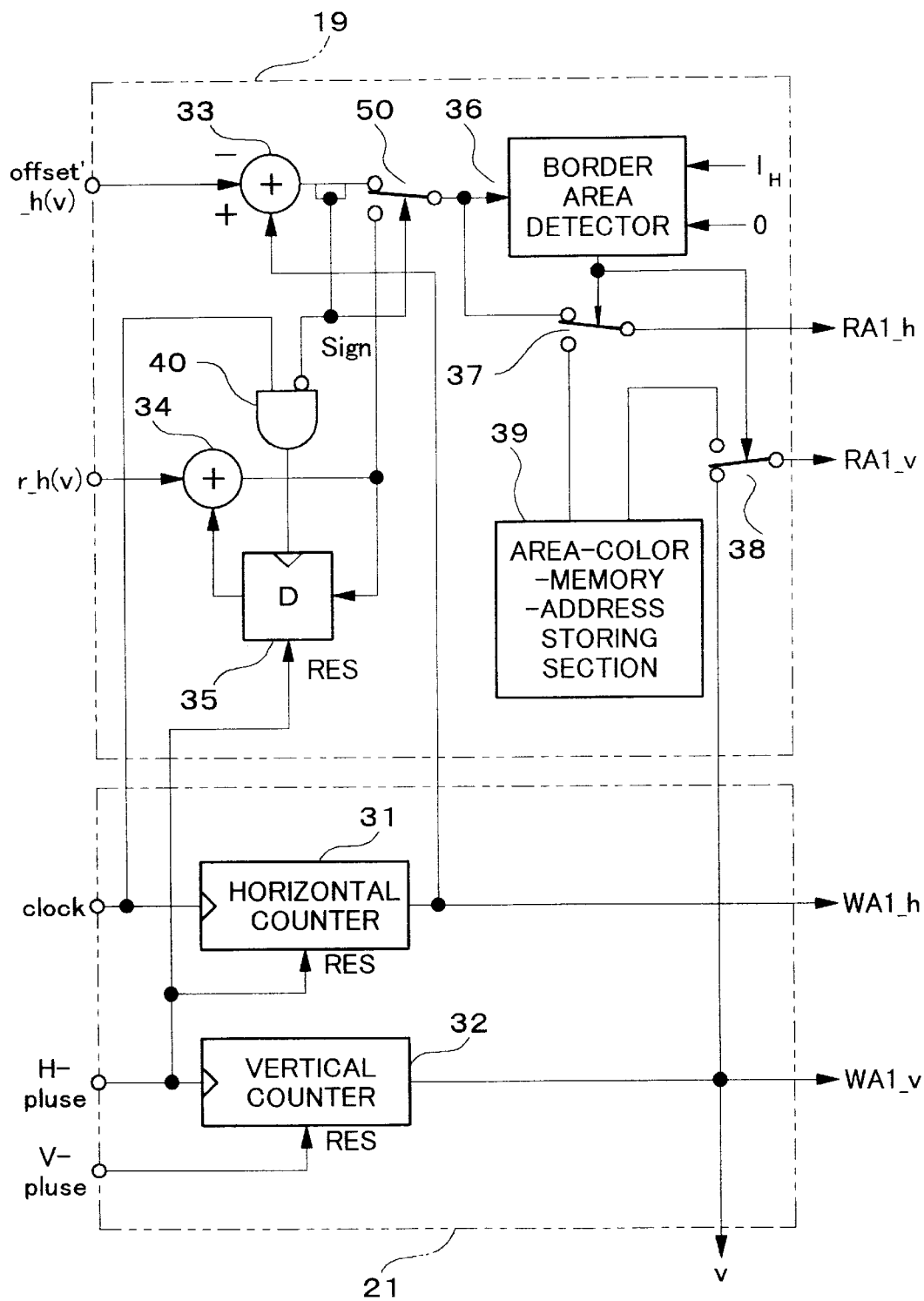
FIG. 10 is a block diagram showing internal configurations of the first-pass-related parts in accordance with a modified embodiment of the system of FIG. 5.

The aforementioned embodiment uses the "calculated" offset values offset'_h(v) and offset'_v(h) which are obtained by multiplying the offset values offset_h(v) and offset_v(h) by the contraction rates r_h(v) and r_v(h) respectively. In addition, the embodiment performs calculations of the accumulative addition of the contraction rate, wherein the calculations are started at the beginning of the scanning. Then, the embodiment subtracts the calculated offset value from a result of the accumulative addition. However, the embodiment can be modified to directly use the "stored" offset values offset_h(v) and offset_v(h) which are stored in the aforementioned Tables 1 and 2. In that case, until the write addresses WA1_h and WA2_v reach the offset values offset_h(v) and offset_v(h), the modified embodiment is set in a mode to block performing the accumulative addition of the contraction rates r_h(v) and r_v(h). When the write addresses reach the offset values, the modified embodiment switches over the mode to start the accumulate addition of the contraction rates r_h(v) and r_v(h). FIG. 10 shows an example of an internal configuration of the first pass address generator 19 which corresponds to the modified embodiment. In FIG. 10, circuit elements which are equivalent to those of FIG. 6 are designated by the same numerals. The first pass address generator shown in FIG. 10 contains an AND gate 40 and a switch 50 in addition to the circuit elements of the first pass address generator shown in FIG. 6.

In the first pass address generator of FIG. 10, the offset value offset_h(v) is supplied to the subtractor 33, wherein the offset value offset_h(v) is read from the transformation table 30 storing the transformation parameters shown in Table 1, for example. The subtractor 33 subtracts the offset value offset_h(v) from the horizontal write address WA1_h to produce the horizontal read address RA1_h. The vertical write address WA1_v is directly output as the vertical read address RA1_v. Using those read addresses, reading of video data can be executed from an outside portion which is placed outside of the range of the original video image 1, stored in the first video memory 11, in a leftward direction in FIG. 3A. Similar to the aforementioned embodiment, area-color-memory addresses are output as the read addresses RA1_h and RA1_v. When the horizontal read address RA1_h reaches the range of the original video image 1, an output of the subtractor 33 is changed over from a negative value to a positive value. A sign bit "Sign" is contained in the output of the subtractor 33 and is used to switch over the switch 50. At the same time, the AND gate 40 is made active, so the reference clock signal "clock" is input to the latch circuit 35. Thereafter, a result of the accumulative addition of the contraction rate r_h(v) is output as the horizontal read address RA1_h.

Figure 11A:
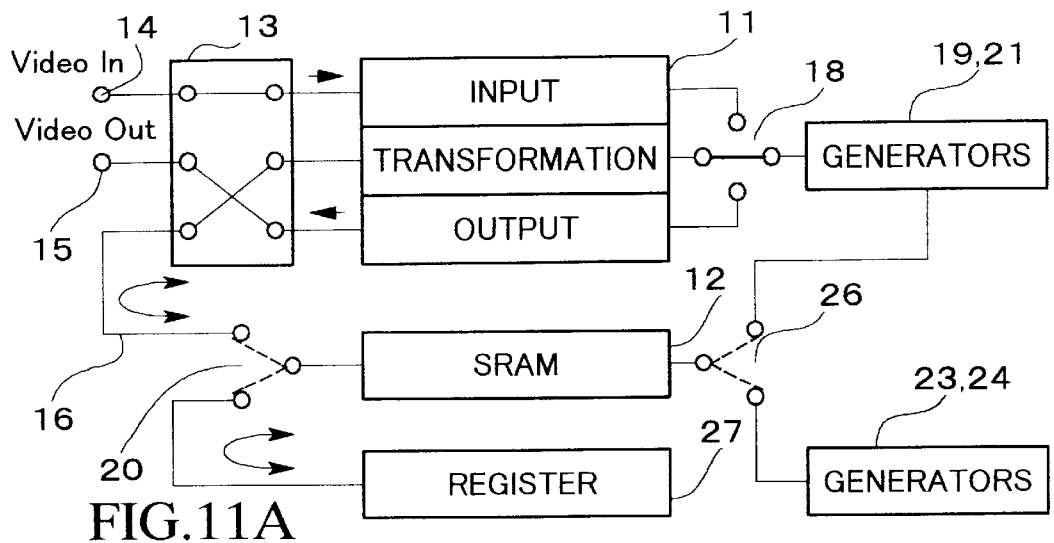
FIGS. 11A, 11B and 11C show simplified blocks, selected from the system of FIG. 5, operations of which are changed over in accordance with cycles.
Figure 11B:
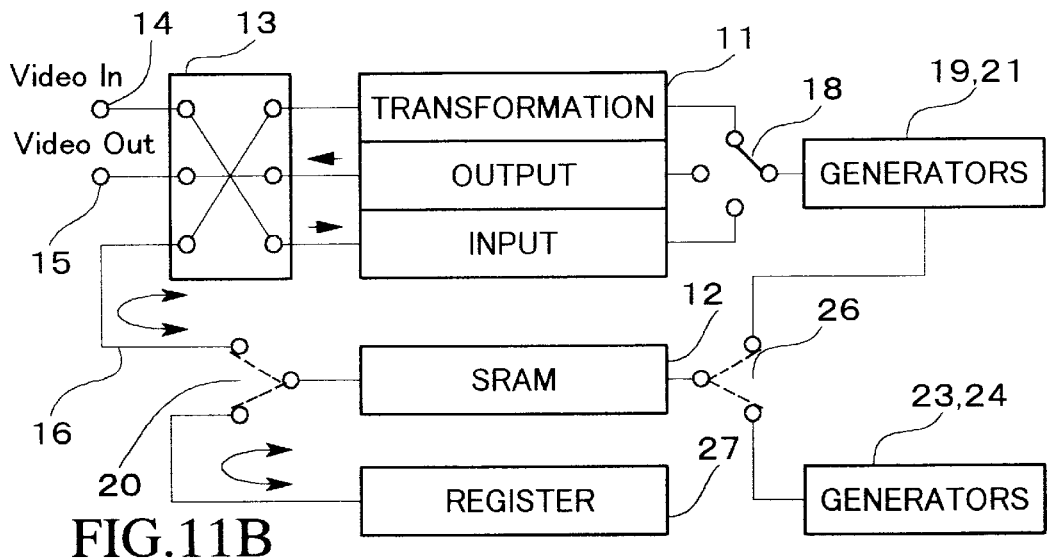
Figure 11C:
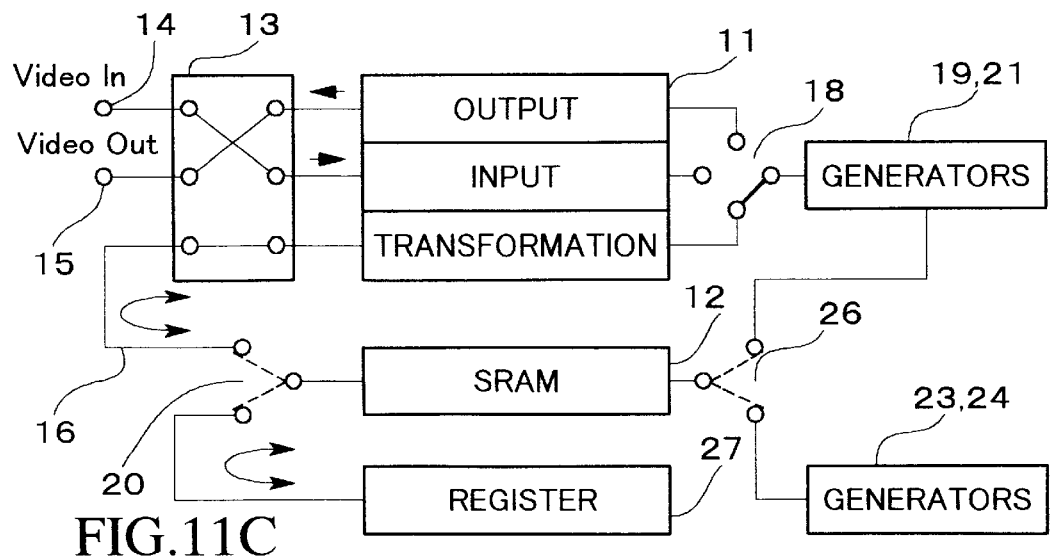
Figure 12A:
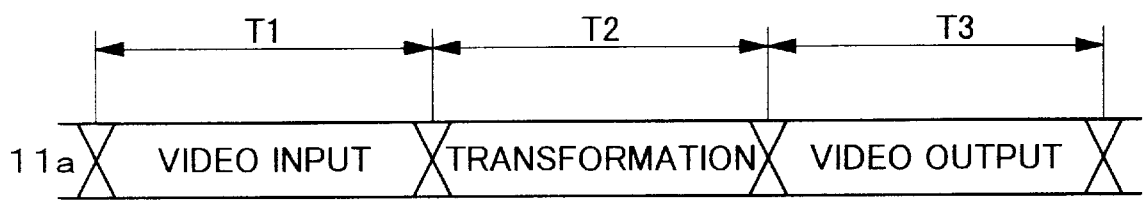
FIGS. 12A, 12B and 12C are time charts showing functions of video memories which are changed over in accordance with cycles.
Figure 12B:
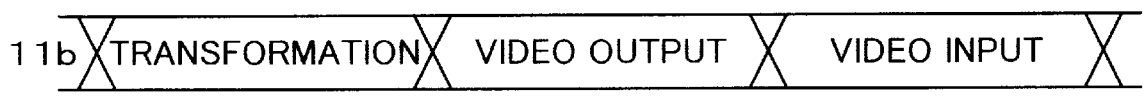
Figure 12C:
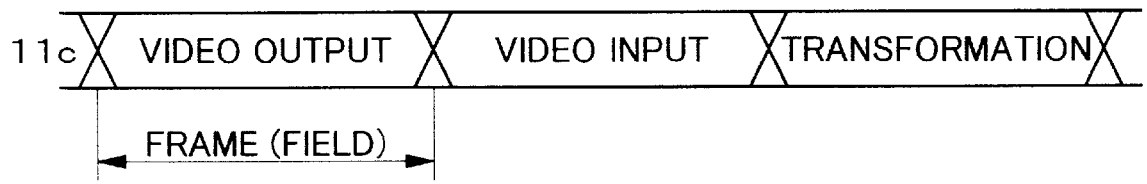

Next, a description will be given with respect to operations of the two-dimensional spatial transformation system corresponding to the modified embodiment of FIG. 10. FIGS. 11A, 11B and 11C show states of connections of the switch 13 which are change over in response to frame cycles (or field cycles). FIGS. 12A, 12B and 12C show time charts representing operational states of the video memories 11a, 11b and 11c of the first video memory 11 in connection with cycles (i.e., frame cycles or field cycles) T1, T2 and T3.

The connections of the switch 13 shown in FIG. 11A are established in the cycle T1. Herein, the video input terminal 14 is connected to the video memory 11a; the video output terminal 15 is connected to the video memory 11c; and the transformation bus 16 is connected to the video memory 11b. In addition, the video memory 11a is placed in a video input cycle wherein the video data representing the original video image are input to the video memory 11a. The video memory 11b is placed in a video transformation cycle which is provided to perform the transformation process. That is, read/write operations are performed between the video memory 11b and the second video memory 12 with respect to video data which are stored in advance in a previous frame. Further, the video memory 11c is placed in a video output cycle wherein a transformed video image whose data are stored in advance in a previous frame is output from the system.

The connections of the switch 13 shown in FIG. 11B are established in the cycle T2. Herein, the video input terminal 14 is connected to the video memory 11c; the video output terminal 15 is connected to the video memory 11b; and the transformation bus 16 is connected to the video memory 11a. Thus, the video memory 11a is placed in the video transformation cycle; the video memory 11b is placed in the video output cycle; and the video memory 11c is placed in the video input cycle.

The connections of the switch 13 shown in FIG. 11C are established in the cycle T3. Herein, the video input terminal 14 is connected to the video memory 11b; the video output terminal 15 is connected to the video memory 11a; and the transformation bus 16 is connected to the video memory 11c. Thus, the video memory 11a is placed in the video output cycle; the video memory 11b is placed in the video input cycle; and the video memory 11c is placed in the video transformation cycle.

In the present system described above, inputting and outputting of the video data are performed by real-time TV scan timings, whilst video transformation is performed by other frame timings. In order to actualize the above operations, buffers are provided for input/output portions of the system. In the conventional system, double buffers are provided for the inputting and outputting of the video data. In contrast, the present embodiment employs triple buffers by which the video input process, video output process and video transformation process are executed in parallel in the same cycle. Thus, it is possible to reduce the required storage capacity of the video memories as a whole.

Next, an in-depth description will be given with respect to processes which the video memory 11a performs in the cycles T1, T2 and T3.

In the cycle T1, the video data of the original video image is input to the video memory 11a. Then, connections of the switch 13 are changed over to set the video memory 11a to the video transformation cycle (T2).

Figure 13A:
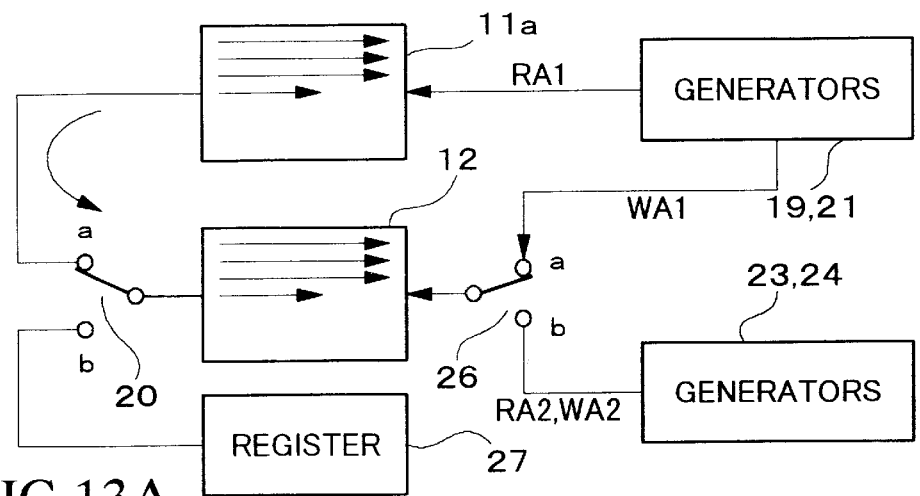
FIGS. 13A, 13B and 13C show simplified blocks, selected from the system of FIG. 5, operations and connections of which are changed over in accordance with a video transformation process.
Figure 13B:
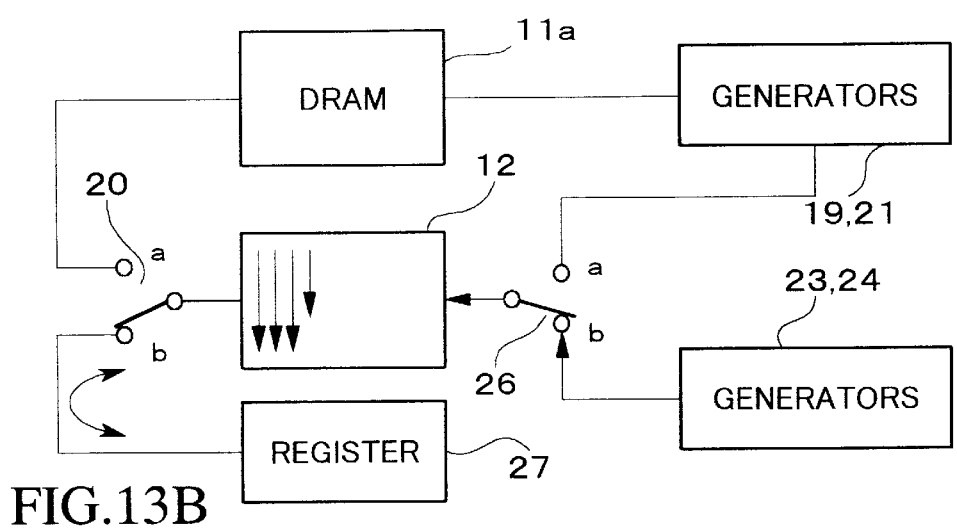
Figure 13C:
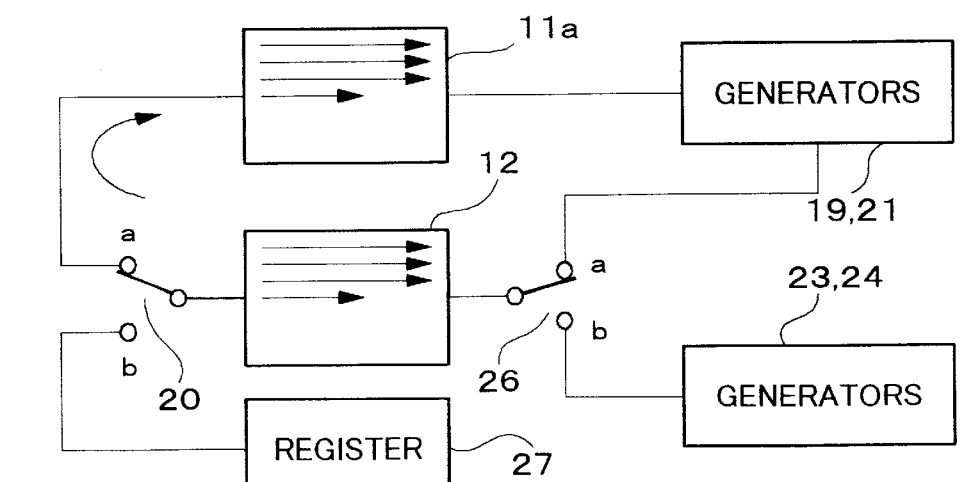

FIGS. 13A, 13B and 13C show flows of video data with respect to processes of the video transformation cycle. FIGS. 14A and 14B are time charts of the video transformation process.

The video transformation cycle consists of a first pass transformation process (i.e., horizontal transformation process) t1, a second pass transformation process (i.e., vertical transformation process) t2, and a write process t3. Herein, the first pass transformation process t1 is performed by writing video data into SRAM, whilst the write process t3 is performed by writing the transformed video image into DRAM.

A flow of video data shown in FIG. 13A is established in the first pass transformation process t1 wherein video data are transferred from the video memory 11a to the second video memory 12 in accordance with the first pass transformation process (i.e., horizontal transformation process). In FIG. 13A, the switches 20 and 26 are both connected to contacts 'a'. So, the read address RA1 output from the first pass address generator 19 is supplied to the video memory 11a, whilst the write address WA1 output from the sequential scan generator 21 is supplied to the second video memory 12 via the switch 26. Thus, video data of transformation addresses are read from the video memory 11a and are sequentially stored in the second video memory 12 in a scanning order. As described above, the first pass transformation process relates to a horizontal direction. So, the video data are read out with a high-speed page mode from the video memory 11a configured by the DRAM. Incidentally, it is possible to read out data from the DRAM of EDO (Extend Data Output) type with a cycle which is 20 nano second or so. So, an execution of the first pass transformation process can be completed with about ¼ of real time.

A flow of video data shown in FIG. 13B is established in the second pass transformation process t2, wherein both of the switches 20 and 26 are connected to contacts 'b'. The vertical transformation process corresponding to the second pass transformation process is executed by two steps, i.e., a read step that video data stored in the second video memory 12 are read out and are loaded into the data register 27 and a write step that video data of the data register 27 are written into the video memory 12. The switch 25 (see FIG. 5) alternatively selects the read address RA2 output from the second pass address generator 23 and the write address WA2 output from the sequential scan generator 24. So, the alternatively selected address is supplied to the second video memory 12 via the switch 26. In this case, the second video memory 12 is configured as shown in FIG. 15 that a storage area of a first row is used as a vacant area (see "Vacant Row" in block 12). Thus, a number of the read address RA2 is increased by '1' as compared with the write address WA2. Thanks to such a configuration of the second video memory 12, it is possible to sequentially write transformation data into the second video memory 12 without destructing non-processed data and without using a "temporary" row buffer. Thus, it is possible to avoid overwriting of data in the second video memory 12. By the way, the high-speed SRAM has an access time which is about 20 nano second. Unlike the DRAM, the high-speed SRAM does not require the aforementioned RAS cycle. So, an execution of the second pass transformation process realizing the vertical transformation can be completed with about ½ of real time.

A flow of video data shown in FIG. 13C is established in the write process t3 regarding the writing of the transformed video image into the DRAM, wherein both of the switches 20 and 26 are connected to contacts 'a'. Like the first pass transformation process t1, the write process t3 is capable of accomplishing a data transfer of the transformed video image from the second video memory 12 to the video memory 11a by the writing of video data into the DRAM with the high-speed page mode. So, an execution of the write process can be completed with about ¼ of real time.

Then, connections of the switch 13 are changed over by a frame timing (or field timing). So, the video data representing the transformed video image which is transferred to the video memory 11a are output from the system of FIG. 5.

Similar processes are repeated with respect to the other video memories 11b and 11c.

As described heretofore, the present embodiment shown in FIG. 5 is characterized by using a DRAM-type video memory having a triple-buffer configuration and a single high-speed-SRAM-type video memory to actualize the high-definition video transformation apparatus of the two-pass method.

In the present embodiment, the first pass is defined as the transformation of the horizontal direction, whilst the second pass is defined as the transformation of the vertical direction. Of course, it is possible to provide a modification of the embodiment that the first pass is defined as the transformation of the vertical direction while the second pass is defined as the transformation of the horizontal direction. In such a modification, a data transfer of a high-speed page mode is performed to transfer video data from the first video memory 11 to the second video memory 12 without performing the transformation process; then, the vertical transformation is performed in the second video memory 12; thereafter, the horizontal transformation is performed in a data transfer to transfer video data from the second video memory 12 to the first video memory 11.

In addition, the present embodiment uses the transformation table to generate the read addresses RA1 and RA2. Of course, the transformation table is not always required in this invention. Because the application of this invention is fundamentally relevant to the transformation system of the two-pass method, this invention can be applied to the system which produces read addresses by matrix calculations.

Next, a description will be given with respect to other embodiments of the invention as well as application of the invention to the animation technology.

Figure 16:
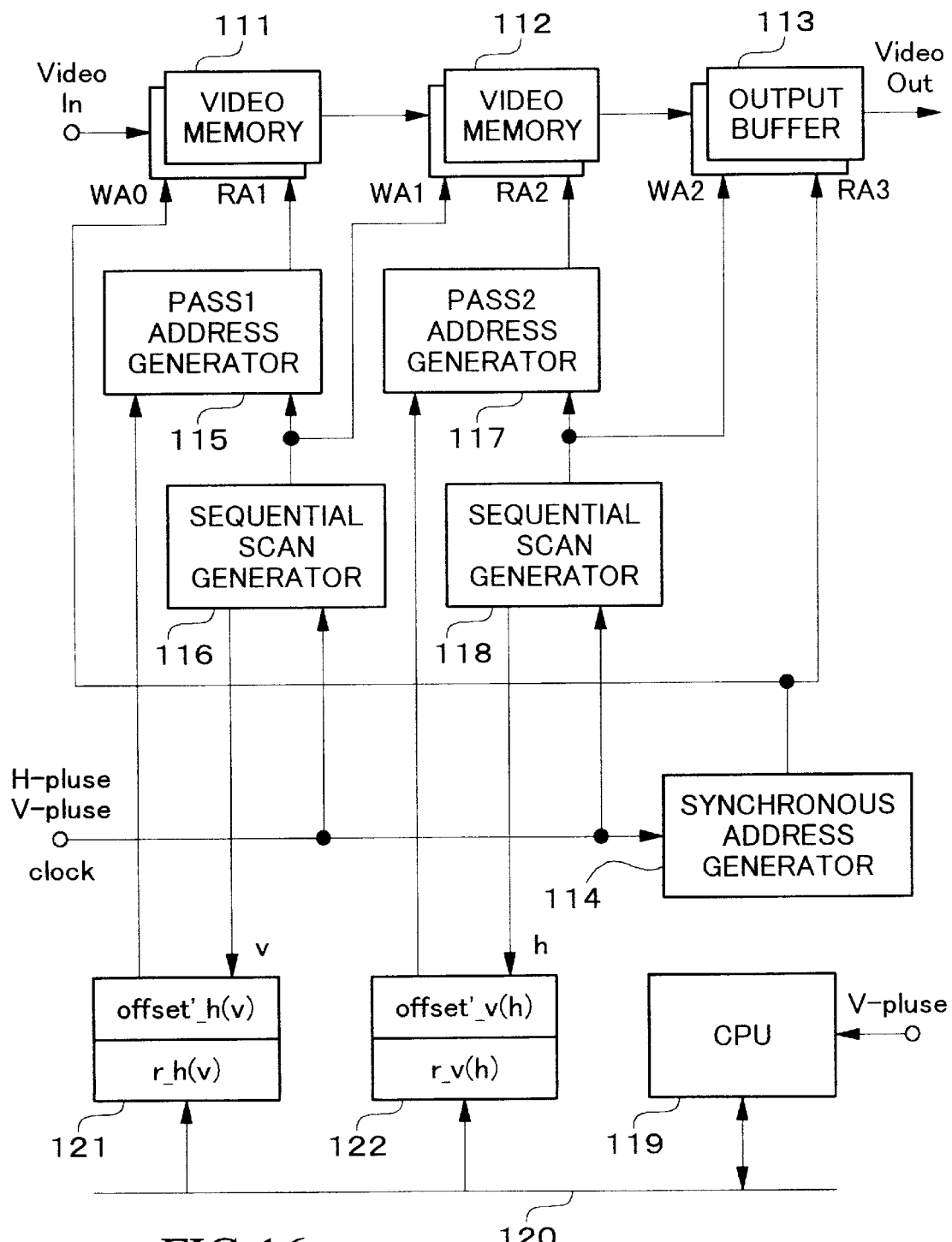
FIG. 16 is a block diagram showing an example of a two-dimensional spatial transformation system in accordance with another embodiment of the invention.

FIG. 16 is a block diagram showing a two-dimensional spatial transformation system employing the two-pass method.

The system of FIG. 16 contains video memories 111, 112 and an output buffer 113 which are connected together in a cascade connection manner. The memories 111, 112 and 113 each have a double-buffer configuration to store video data representative of an original video image, an intermediate video image and a transformed video image respectively. A synchronous address generator 114 produces a write address WA0 for the video memory 111 and a read address RA3 for the output buffer 113. In addition, a first pass (Pass1) address generator 115 produces a read address RA1 for the video memory 111; a sequential scan generator 116 produces a write address WA1 for the video memory 112; a second pass (Pass2) address generator 117 produces a read address RA2 for the video memory 112; and a sequential scan generator 118 produces a write address WA2 for the output buffer 113. A CPU 119 calculates transformation parameters. By being interrupted by vertical synchronizing pulses of video signals, the CPU 119 transfers the transformation parameters to RAMs via a bus 120, so that the transformation parameters are stored in transformation tables 121 and 122.

Video data representing an original video image are applied to an input terminal of "Video In". The video data are written into a first bank of the video memory 111 in accordance with the write address WAO. Herein, the video data are sequentially written into the video memory 111 in real time in accordance with a normal scanning order. A second bank of the video memory 111 stores video data representative of a previous video image of a previous field (or previous frame) in advance. The video data of the original video image are read from the video memory 111 in accordance with the read address RA1 of the first pass address generator 115. The read video data are sequentially written into a first bank of the video memory 112 by the write address WA1 of the sequential scan generator 116 in accordance with a normal scanning order. A second bank of the video memory stores video data representative of an intermediate video image which is obtained by performing a first pass process on a previous video image of a previous field (or previous frame). At the same time when the video data of the original video image are written into the first bank of the video memory 112 as described above, the video data of the intermediate video image are read from the video memory 112 in accordance with the read address RA2 of the second pass address generator 117. Then, the video data of the intermediate video image are written into the output buffer 113 in accordance with the write address WA2 of the sequential scan generator 118. Like the video memories 111 and 112, the output buffer 113 has a double-buffer configuration. So, video data representative of a transformed video image are consecutively read from an output bank of the output buffer 113 in real time and are output to an output terminal of "Video Out". Selection of banks is changed over by each field or by each frame with respect to the video memories 111, 112 and the output buffer 113 respectively. So, a series of processes described above are repeated in real time.

The first pass address generator 115 generates the read address RA1 based on the transformation parameters stored in the transformation table 121, whilst the second pass address generator 117 generates the read address RA2 based on the transformation parameters stored in the transformation table 122. To enable easy generation of the read addresses RA1 and RA2, the present embodiment of FIG. 16 uses "calculated" offset values offset'_h(v) and offset'_v(h) which are produced by multiplying offset values offset_h(v) and offset_v(h) by contraction rates r_h(v) and r_v(h) respectively. The offset values offset_h(v) and offset_v(h) are shown in the aforementioned Tables 1 and 2. In addition, the transformation table 121 stores the transformation parameters of the aforementioned Table 3, whilst the transformation table 122 stores the transformation parameters of the aforementioned Table 4.

The CPU 119 works to load the above transformation parameters to the tables in vertical blanking periods of video signals prior to processing of the field (or frame). During transformation of a current video image, the CPU 119 executes calculations to produce parameters for a next video image based on coordinates values (xa, ya), (xb, yb), (xc, yc) and (xd, yd) of four corners A', B', C' and D' of a next transformed video image, for example.

Internal configurations of the first pass address generator 115 and sequential scan generator 116 can be shown by the aforementioned block diagram of FIG. 6 or FIG. 10, whilst internal configurations of the second pass address generator 117 and sequential scan generator 118 can be shown by the aforementioned block diagram of FIG. 9. Hence, description of the above internal configurations are not described specifically.

Incidentally, the present embodiment is designed in such a way that the first pass is defined as the transformation of the horizontal direction, whilst the second pass is defined as the transformation of the vertical direction. Of course, it is possible to change the directions. That is, the present embodiment can be modified such that the first pass is defined as the transformation of the vertical direction while the second pass is defined as the transformation of the horizontal direction. Such a modification can be easily actualized by changing the circuit elements of 115, 116 and 121 with the circuit elements of 117, 118 and 122. This modification is quite convenient because the final output of the system corresponds to the scanning of the horizontal direction like the normal video signals.

The output buffer 113 is required exclusively in the case where a DRAM is used for the video memory 112 so that reading of the video memory 112 can be performed in real time by the setting of row addresses, for example. In other words, if the real-time reading can be carried out with respect to the video memory 112, the output buffer 113 is not required.

Next, a description will be given with respect to a method of imparting a pseudo perspective effect to a video image.

The pseudo perspective effect is actualized by transforming the read addresses RA1_h and RA2_h (see FIGS. 6, 9 and 10) on the basis of the contents of the transformation tables during an execution of the bilinear transformation process.

Figure 17:
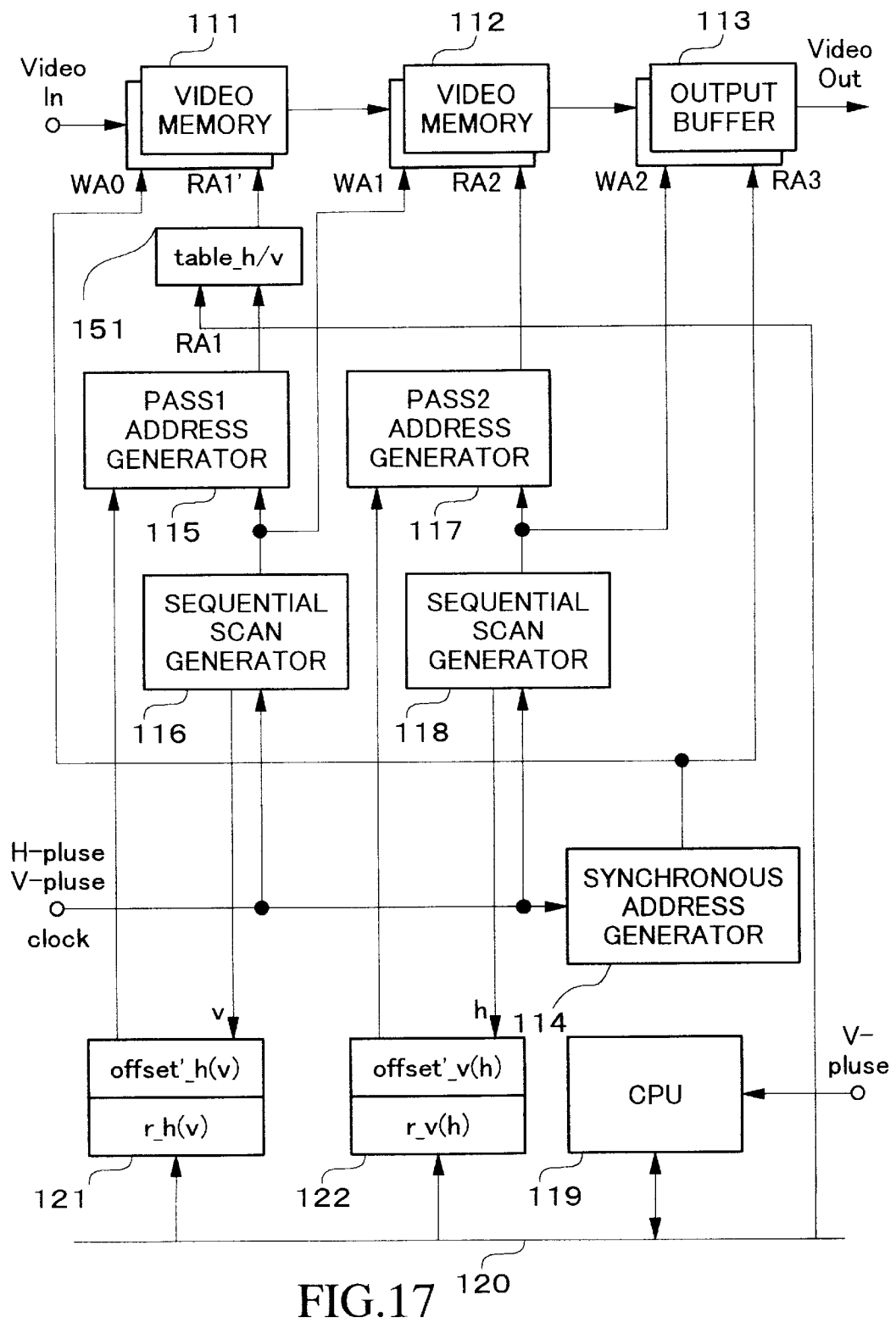
FIG. 17 is a block diagram showing a modified example of the two-dimensional spatial transformation system shown in FIG. 16.

FIG. 17 is a block diagram showing an example of the two-dimensional spatial transformation system which actualizes the pseudo perspective effect, wherein parts equivalent to those of FIG. 16 are designated by the same numerals; hence, the description thereof will be occasionally omitted.

As compared with the system of FIG. 16, the system of FIG. 17 is characterized by providing a transformation table 151 (consisting of table_h and table_v) between the video memory 111 and the first pass address generator 115. The transformation table 151 transforms the read address RA1 of the first pass address generator 115 to a read address RA1', which is then supplied to the video memory 111. The reason why the transformation table 151 is provide for the first pass is that the first pass is designed to provide a perspective effect with respect to both of the h-axis and v-axis. Namely, such a transformation table is not required for the second pass.

It is possible to propose a variety of algorithms for the parameter calculating method of the transformation table 151. An example of the calculation method is described as follows:

[Math 9]

$$v' = A \cdot v + B \quad (A, B: \text{constant})$$

Performing integration on the mathematical equation of [Math 9], it is possible to obtain equations of [Math 10], as follows:

$$l(v) = \frac{A \cdot v^2}{2} + B \cdot v + C$$

$$l(O) = O, \, l(V) = lV$$

$$\text{then } A = \frac{2(l - B)}{lV}$$

Figure 18:
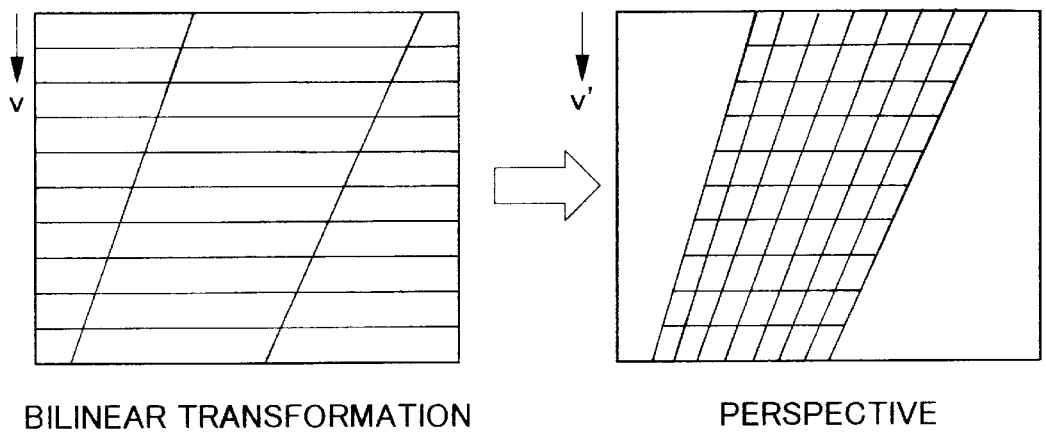
FIG. 18 shows examples of video images which are used to explain a perspective effect.

Using appropriate values for A and B, it is possible to calculate parameters for a table of "l(v)". The CPU 119 creates the transformation table 151 like the aforementioned transformation tables 121 and 122. That is, the CPU 119 calculates parameters prior to next transformation; then, the CPU 119 stores them in a memory such as a RAM to form the transformation table 151 in the vertical blanking periods of video signals. FIG. 18 shows an example of the perspective effect which can be provided as described above Setting appropriate parameters to table_h and table_v, it is possible to shift read positions of the video memory 111. Thus, it is possible to further obtain a special video effect such as multi-screen effects, for example.

Figure 19A:
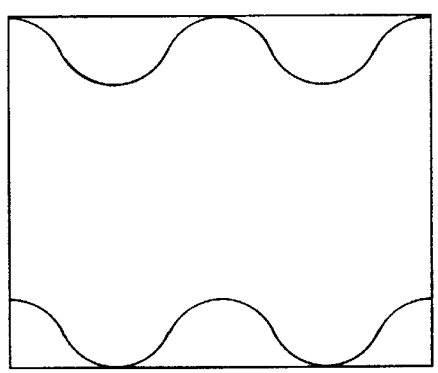
FIGS. 19A and 19B show examples of video images in accordance with visual effects.
Figure 19B:
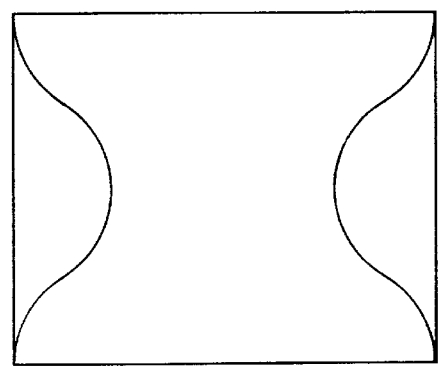

The systems of FIGS. 16 and 17 are designed such that transformation parameters for the bilinear transformation are stored in the transformation tables 121 and 122. Herein, it is possible to set specific fixed values to the offset values and contraction rates. Thus, it is possible to provide special video effects other than the bilinear transformation, such as a "wave" effect of FIG. 19A and a "pinch" effect of FIG. 19B.

Figure 20:
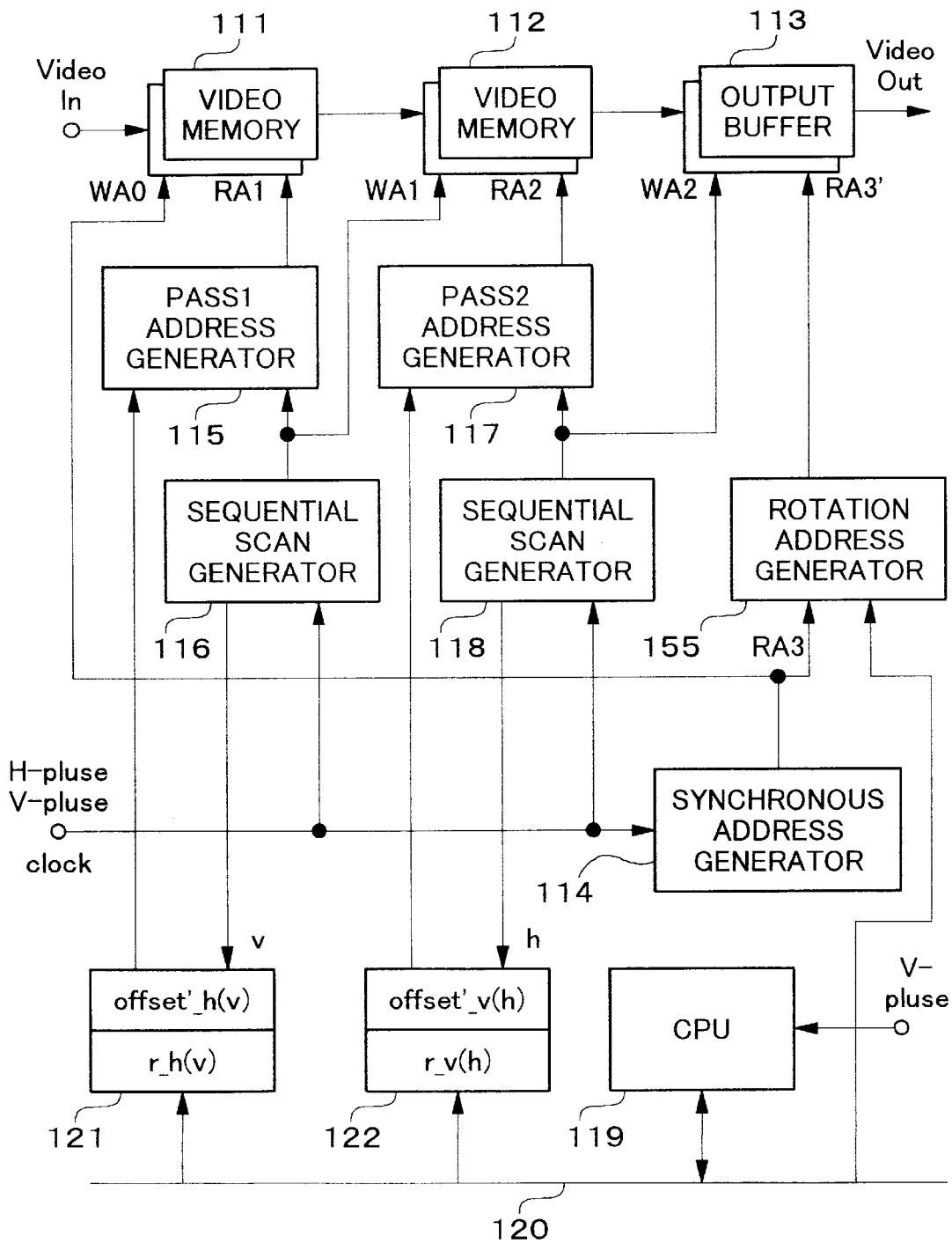
FIG. 20 is a block diagram showing a further example of the two-dimensional spatial transformation system.

By the way, it is possible to modify the system of FIG. 16 as shown in FIG. 20. Herein, the read address RA3 which is used to read the transformed video image is supplied to a rotation address generator 155. The rotation address generator 155 imparts a factor representing a certain angle of rotation to the read address RA3 so as to produce a new read address RA3'. Using the read address RA3', the output buffer 113 outputs a rotated video image which is produced by rotating the transformed video image by the certain angle of rotation. In the modified system of FIG. 20, the CPU 119 calculates transformation parameters which are stored in a table. Thus, it is possible to actualize real-time processing in the modified system of FIG. 20.

In order to obtain real-time special video effects using the aforementioned systems, the CPU 119 should execute calculations to produce the transformation parameters for the transformation tables 121, 122 and 151 respectively by each field or by each frame. Herein, the transformation parameters should be provided with respect to each row and each column of a screen of a display. So, a large amount of calculations are not required. In case of a field process for 640×240 pixels, numbers of the transformation parameters are shown in Table 5, as follows:

TABLE 5

| Transformation parameter | Number of parameters |
| --- | --- |
| offset_h(v) | 240 |
| offset_v(h) | 640 |
| r_h(v) | 240 |
| r_v(h) | 640 |

TABLE 5-continued

| Transformation parameter | Number of parameters |
| --- | --- |
| table_h(v) | 640 |
| table_v(h) | 240 |
| Total number of parameters | 2,640 |

So, the CPU 119 performs calculations to produce 2,640 transformation parameters in a period of one field, i.e., in 15 msec. This means that the CPU 119 requires calculation time of 5 to 6 μsec per one transformation parameter. As for the CPU of several tens of Mega Hz, 100 cycles or so are assigned to the calculation of one transformation parameter. Such an amount of calculations and such a performance of processing can be sufficiently actualized in real time processing by a general-use and non-expensive CPU.

As memories embodying the transformation tables 121, 122 and 151, it is possible to use "specified" RAMs. Instead, it is possible to set the tables to vacant areas of the video memories 111 and 112 by mapping. In general, the size of the screen handled by the video devices is represented by pixels of 640×240 (or 480) or pixels of 720×483. The general-use memory devices such as the DRAM and VRAM have regulated capacity having a number of mega bytes which is represented by square numbers of '2', i.e., 4 Mega bytes or 16 Mega bytes, for example. So, non-used vacant areas should exist in the memory devices. Such vacant areas are used as the transformation tables.

If the transformation parameters are subjected to mapping to the video memories, it is necessary to provide read/write operations of the transformation parameters in addition to read/write operations of the video data with regard to the video memories. So, overhead may occur with regard to memory access. Such overhead is negligible because the video memory has a double-buffer configuration. Namely, writing of the transformation parameters to the video memory can be performed in non-real-time durations. In addition, the same offset value and contraction rate are applicable to each row or each column. This means that those values should be read out one time with respect to one row or with respect to one column.

Next, a description will be given with respect to processing of video images whose luminance data Y and color data U, V are subjected to sampling of different frequencies.

Figure 21A:
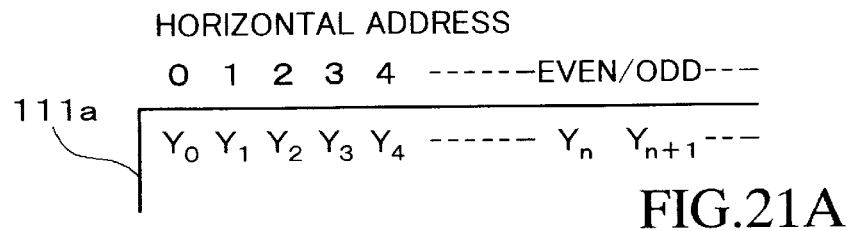
FIGS. 21A and 21B show contents of video memories in accordance with a format of video data of "Y. UV. 4:2:2"
Figure 21B:
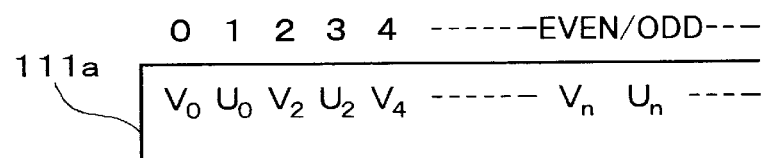

To reduce the cost of the system, amounts of color data U, V are reduced to half an amount of luminance data Y. Such reduced amounts of video data are realized by so-called "Y. UV. 4:2:2 format". Based on this format, an overall storage area of the video memory is divided into two parts, for example, which correspond to a Y video memory (i.e., video memory for the luminance data Y) and a UV video memory (i.e., video memory for the color data U, V). FIG. 21A shows an arrangement of luminance data Y0, Y1, Y2, ... stored in a Y video memory 111a while FIG. 21B shows an arrangement of color data V0, U0, V2, U2, ... stored in a UV video memory 111b. The data are arranged with a density of pixels in a horizontal direction in accordance with horizontal addresses. Herein, the color data are stored in the UV video memory 111b with a certain density of pixels which is half a density of pixels with which the luminance data are stored in the Y video memory 111a. As for the UV video memory 111b, V data are stored at even-number addresses while U data are stored at odd-number addresses. Such a relationship between the V data, U data and addresses remains the same when the video data are read from the video memory 111 in accordance with addresses which match with the transformation parameters and are then written into the video memory 112. That is, even if the read addresses of the video memory 111 change in a variety of ways, the video data should be written into the video memory 112 in accordance with the aforementioned format. Namely, the V data should be written at even-number addresses while the U data should be written at odd-number addresses.

Figure 22:
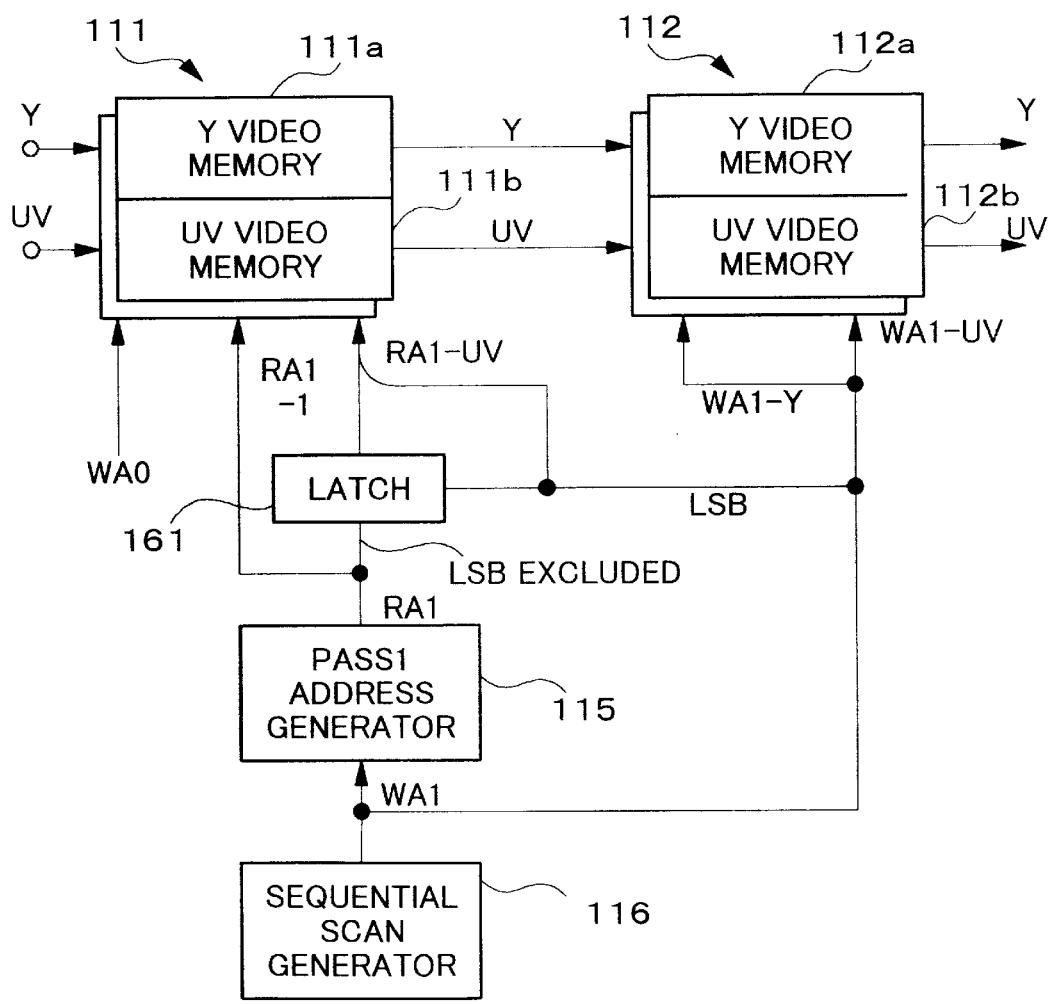
FIG. 22 is a block diagram showing essential parts of a still further example of the two-dimensional spatial transformation system in accordance with the above format.

FIG. 22 shows essential parts of the two-dimensional spatial transformation system which is modified in consideration of the above format.

Like the aforementioned embodiments, the first pass address generator 115 outputs the read address RA1 for the video memory 111. In the system of FIG. 22, the read address RA1 is directly used as a read address RA1-Y for the Y video memory 111a. A latch circuit 161 latches the read address RA1 except its LSB. A LSB of the write address WA1 of the sequential scan generator 116 is added to an output of the latch circuit 161 so as to produce a read address RA1-UV for the UV video memory 111b. Thus, even if the read address RA1 changes in a variety of ways, the address RA1-UV should represent numbers which alternatively correspond to an even number and an odd number. In other words, the read addresses for the UV video memory 111b change in an order of numbers which alternatively correspond to the even number and odd number. Similarly, numbers represented by a write address WA1-UV change in the same order that the numbers of the read address RA1-UV change.

Next, a description will be given with respect to an example of an animation display system employing the aforementioned two-dimensional spatial transformation.

In general, two-dimensional amination is actualized by moving aminated video images on a screen. The animated video images contain so-called "characters" (e.g., animated human images) and "objects". Generally, there are two kinds of methods to produce the two-dimensional amination, i.e., a sprite method that has each character and each object registered as "sprite" and a computer-graphics method that uses computer graphics.

In the sprite method, a series of operations are recorded by each frame (or each field) with respect to an animated video image. Then, by continuously changing the sprite, it is possible to actualize the "movement" of the animated video image. Or, the aminated video image (e.g., object) is divided into parts. So, each of the parts is registered as the sprite. Then, by combining the parts on the screen, it is possible to actualize the movement of the animated video image.

However, the above sprite method which is conventionally known suffers from a drawback that the movement of the aminated video image is somewhat fixed or movement of the animated video image is somewhat limited. To provide a large number of expressions with respect to the animated video image, it is necessary to accumulate an enormous number of sprites. Therefore, there is a problem that the sprite method requires a large capacity of memory.

In the computer-graphics method, the computer calculates movement of an object. Therefore, the computer calculates a shape and a display position of the object by each frame (or each field) to actualize the movement of the object on a display screen. However, the computer-graphics method requires the computer to provide high computing performance to realize real-time processing for the movement of the object. So, the computer-graphics method suffers from a problem that high cost is required to realize the two-dimensional animation.

The above problems can be eliminated by the two-dimensional spatial transformation system of this invention.

That is, this invention is applicable to the two-dimensional animation technology to produce animated video images in real time with a variety of expressions and with reduction of the cost.

Figure 23:
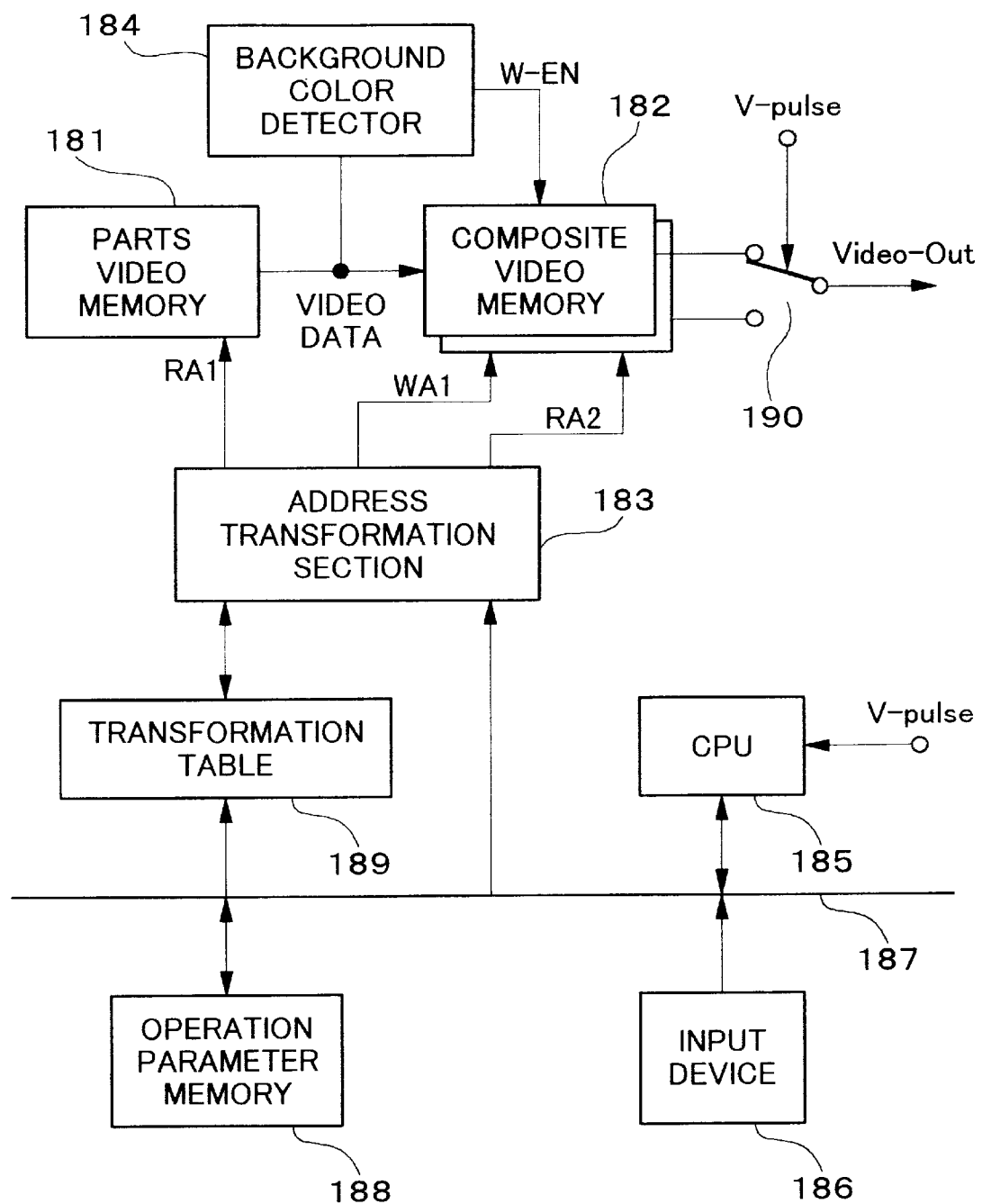
FIG. 23 is a block diagram showing an example of a configuration of an animation display system employing the two-dimensional spatial transformation.

FIG. 23 is a block diagram showing a configuration of an animation display system to which this invention is applied.

A parts video memory 181 has a function corresponding to the aforementioned video memory 111. Specifically, the parts video memory 181 stores parts of an original video image which corresponds to an animated object to be displayed. A composite video memory 182 has a function corresponding to the aforementioned video memory 112. In a composite video memory 182, a two-dimensional spatial transformation process of this invention is performed on the parts of the original video image so as to produce a composite video image. Like the video memory 112, the composite video memory 182 has a double-buffer configuration. A switcher 190 switches over banks of the composite video memory 182 by each field or by each frame. Thus, it is possible to produce video images in real time. An address transformation section 183 contains functions of the aforementioned address generators 115, 117, sequential scan generators 116, 118, synchronous address generator 114, border area detector and switches. Based on transformation parameters read from a transformation table 189, the address transformation section 183 produces first-pass and second-pass addresses, i.e., a read address RA1, a write address WA1 and a read address RA2. A background color detector 184 detects a background color from video data. So, the background color detector 184 avoids overwriting of the background color during composition of video image(s).

An input device 186 such as a mouse and a joy stick is connected to a CPU 185 via a bus 187. The CPU 185 calculates operation parameters of an object in real time with respect to each display screen. So, the calculated operation parameters are stored in an operation parameter memory 188. Incidentally, it is not necessary to calculate the operation parameters. That is, it is possible to use preset values as the operation parameters stored in the operation parameter memory 188. The CPU 185 calculates transformation parameters such as offset values and contraction rates based on the operation parameters with respect to each display screen. The calculated transformation parameters are stored in the transformation table 189.

Figure 24A:
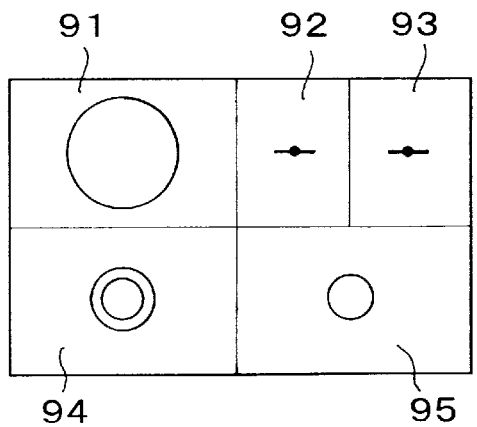
FIGS. 24A, 24B, 24C and 24D show video images which are used to explain procedures for video composition of parts of an animated video image.
Figure 24B:
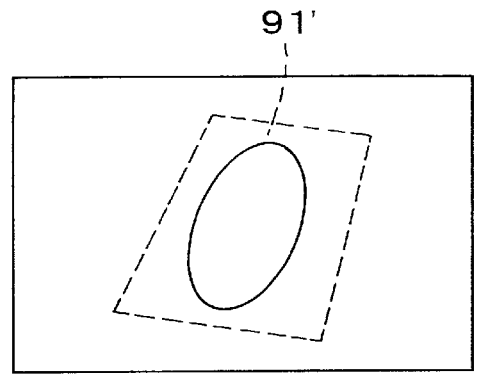

Next, a description will be given with respect to operations of the animation display system in conjunction with FIGS. 24A, 24B, 24C and 24D. As shown in FIG. 24A, the parts video memory 181 stores parts 91 to 95 of an original video image corresponding to an object to be animated. The part 91 of the original video image is subjected to bilinear transformation using the aforementioned transformation parameters. Thus, it is possible to produce a part 91' of a transformed video image shown in FIG. 24B. Herein, the system imparts offset values, corresponding to a storage area of the part 91 of the original video image, to the transformation parameters. In addition, a specific background color is implanted in a border area. Similar transformation is performed on other parts; and consequently, it is possible to obtain parts 92' to 95' of the transformed video image. Those parts are subjected to composition to produce a composite video image shown in FIG. 24C. In the composition, the parts are subjected to overwriting. Herein, writing is sequentially performed on the parts in a priority order that writing of the parts is started from the part having a low priority order. Thus, the parts are sequentially overwritten on the display screen and are partially overlapped with each other. So, the part having a lowest priority order is displayed in a deepest position of the display screen while the part having a highest priority order is displayed in a frontest position of the display screen. It may be possible to start writing of the parts from the part having the highest priority order. In this case, however, it is necessary to provide a process to prohibit writing from being performed with respect to pixels on which some part has been already written. So, processing should be complicated.

At a video image composition mode, a background color detector 184 performs detection as to whether video data read from the parts video memory 181 coincide with data representing the background color which is determined in advance. If so, the background color detector 184 makes a write enable signal W-EN for the composite video memory 182 in a non-active state; and consequently, the system of FIG. 23 prevents data of the background color from being overwritten.

Figure 24C:
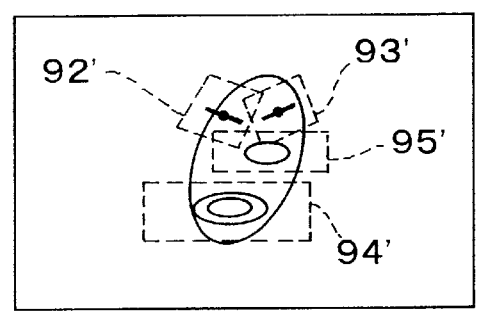
Figure 24D:
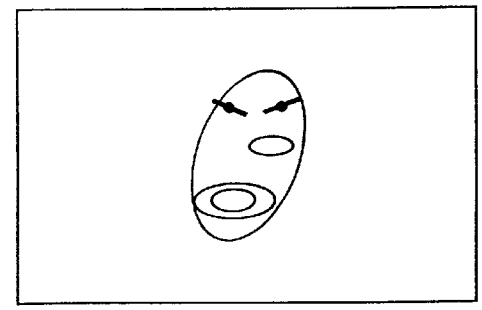

The aforementioned composition process is performed on all parts of the transformed video image shown in FIG. 24C, so it is possible to produce a composite video image shown in FIG. 24D.

Incidentally, the present system is designed such that video data read from the composite video memory 182 are directly output via the switcher 190. So, if the first pass is defined as the transformation of the vertical direction while the second pass is defined as the transformation of the horizontal direction, a final output of the system matches with the normal scanning of video images. For this reason, the present system is convenient.

The operations of the present system can be summarized as follows:

The operation parameters are determined based on an operation to be animated. The transformation parameters are calculated with respect to each part by each frame of display screen. The composition process is executed with respect to each frame of display screen.

Thus, it is possible to display "complicated" animated images in real time on the screen with an extremely simple configuration of system. In addition, it is possible to rewrite the parts of the original video image on demand. So, it is possible to display multiple kinds of objects on the screen of the display.

Figure 25A:
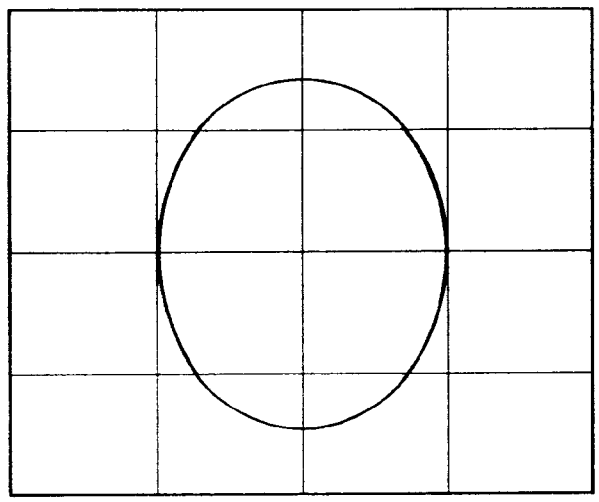
FIGS. 25A and 25B show video images which are used to show a mesh-warping effect on an animated video image.
Figure 25B:
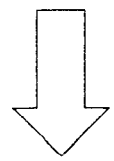
Figure 25B:
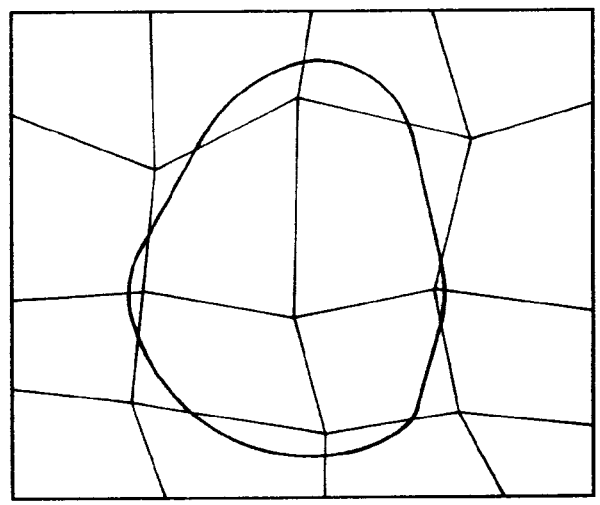
Figure 26:
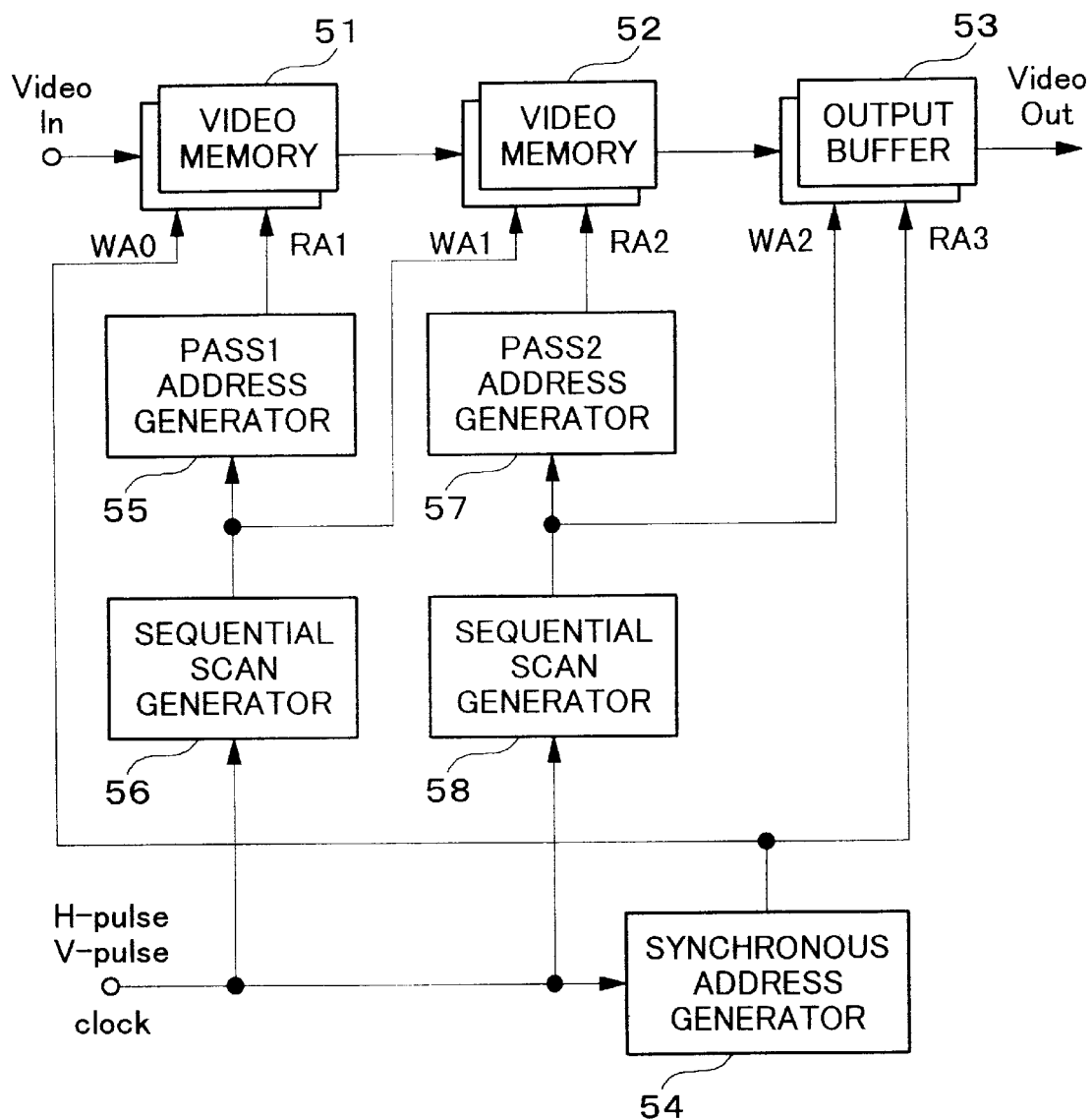
FIG. 26 is a block diagram showing a conventional example of the two-dimensional spatial transformation system employing the two-pass method.

Using the above functions, an original video image consisting of parts shown in FIG. 25A can be transformed to provide a so-called mesh-warping effect as shown in FIG. 25B.

Lastly, applicability of this invention can be extended in a variety of ways. The aforementioned embodiments of this invention use memory devices as the storage media. Of course, it is possible to use other storage media such as CD-ROMs, magneto-optics disks, floppy disks and hard disks. For example, it is possible to use a CD-ROM for storing programs, data and parameters of the aforementioned embodiments. Or, the CD-ROM can be used to provide version-upgrade programs, data and parameters for the system of this invention. Further, the system of this invention can be linked with a server computer via a communication network such as a local area network (LAN), a computer network such as "internet" and telephone lines. So, programs of this invention can be down-loaded to the system from the server computer via the communication network.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A two-dimensional spatial transformation system wherein a two-dimensional spatial transformation of an original video image onto a two-dimensional space is divided into a transformation process of a horizontal direction and a transformation process of a vertical direction so that the transformation processes are sequentially executed, the two-dimensional spatial transformation system comprising:

first video storing means for storing video data representing the original video image, wherein the first video storing means is configured by a first memory device which is accessed in the horizontal direction by a high-speed page mode; and second video storing means for storing the video transferred thereto from the first video storing means, wherein the second video storing means is accessed to execute the transformation process of the vertical direction and is configured by a second memory device for storing at least video data which are provided before and after the transformation process of the vertical direction, wherein the transformation process of the horizontal direction is based on transformation parameters including offset values and contraction rates for the transformation process of the horizontal direction, the offset values being provided to indicate positions to start plotting of pixels corresponding to horizontal lines of the original video image and the contraction rates being provided to allow the contraction of the shape and size of the original video image, and the transformation process of the vertical direction is based on transformation parameters including offset values and contraction rates for the transformation process of the vertical direction, the offset values being provided to indicate positions to start plotting of pixels corresponding to vertical lines of the video image after the transformation process of the horizontal direction and the contraction rates being provided to allow the contraction of the shape and size of the video image after the transformation process of the horizontal direction.

2. A two-dimensional spatial transformation system according to claim 1 wherein the second video storing means is configured such that an address for each video data before the transformation process of the vertical direction is increased to be larger than an address for each video data after the transformation process of the vertical direction by a predetermined value, so that the video data after the transformation process is prevented from being overwritten onto video data which are not subjected to the transformation process.

3. A two-dimensional spatial transformation system according to claim 1 wherein the first video storing means is configured by a first storing portion, a second storing portion and a third storing portion while switching means is further provided to change over the first, second and third storing portions by each frame or by each field, wherein the video data representing the original video image are sequentially input to the first storing portion, so that the first storing portion stores the original video image, the second storing portion stores a transformed video image which is produced by transforming the original video image stored in the first storing portion, and the third storing portion is provided to output the transformed video image.

4. A two-dimensional spatial transformation system according to claim 1 wherein the first video storing means is configured by a first storing portion, a second storing portion and a third storing portion which are changed over by each frame or by each field, wherein the first storing portion performs a storing process to store the original video image, the second storing portion stores a result of a video transformation process to transform the original video image to a transformed video image, and the third storing portion performs an output process to output the transformed video image, wherein the storing process, the transformation process and the output process are executed in parallel within a same frame cycle or a same field cycle, and the video transformation process is constructed by the transformation process of the horizontal direction which is executed by a reading operation to read the video data from the second storing portion in the horizontal direction and a writing operation to write the video data into the second video storing means in the horizontal direction, the transformation process of the vertical direction which is executed by a reading operation to read the video data from the second video storing means in the vertical direction and a writing operation to write the video data into the second video storing means in the vertical direction, and a read/write process which is executed by a reading operation to read the transformed video image from the second video storing means in the horizontal direction and a writing operation to write the transformed video image into the second storing means.

5. A two-dimensional spatial transformation method wherein a two-dimensional spatial transformation of an original video image onto a two-dimensional space is divided into a transformation process of a first axis direction and a transformation process of a second axis direction perpendicular to the first axis direction so that the transformation processes are sequentially executed, the two-dimensional spatial transformation method comprising the steps of:

creating a first table which stores offset values and contraction rates for the transformation process of the first axis direction with respect to each of scanning lines of the first axis direction, wherein the offset values are provided to indicate positions to start plotting of pixels corresponding to horizontal lines of the original video image, and the contraction rates are provided to allow the contraction of the shape and size of the original video image;

creating a second table which stores offset values and contraction rates for the transformation process of the first axis direction with respect to each of scanning lines of the second axis direction, wherein the offset values are provided to indicate positions to start plotting of pixels corresponding to vertical lines of the video image after the transformation process of the first axis direction, and the contraction rates are provided to allow the contraction of the shape and size of the video image after the transformation of the first axis direction;

executing the transformation process of the first axis direction by shifting a read address and a write address for a video memory in the first axis direction on the basis of the offset values stored in the first table while controlling an interval between read addresses and an interval between write addresses for the video memory in the first axis direction on the basis of the contraction rates stored in the first table; and executing the transformation process of the second axis direction by shifting a read address and a write address for the video memory in the second axis direction on the basis of the offset values stored in the second table while controlling an interval between read addresses and interval between write addresses for the video memory in the second axis direction on the basis of the contraction rates stored in the second table.

6. A two-dimensional spatial transformation method according to claim 5 wherein contents of the first and second tables are sequentially rewritten to provide a real-time variation of a transformed video image which is produced by performing the transformation processes on the original video image.

7. A two-dimensional spatial transformation system wherein a two-dimensional spatial transformation of an original video image onto a two-dimensional space is divided into a transformation process of a first axis direction and a transformation process of a second axis direction perpendicular to the first axis direction so that the transformation processes are sequentially executed, the two-dimensional spatial transformation system comprising:

first video storing means for storing the original video image;

second video storing means for storing an intermediate video image which is produced by performing the transformation process of the first axis direction on the original video image stored in the first video storing means;

calculation means for calculating transformation parameters, wherein the transformation parameters contain offset values and contraction rates which are calculated with regard to each of scanning lines for the transformation process of the first axis direction to transform the original video image onto the two-dimensional space as well as offset values and contraction rates which are calculated with regard to each of scanning lines for the transformation process of the second axis direction to transform the intermediate video image onto the two-dimensional space, wherein the offset values are provided to indicate positions to start plotting of pixels corresponding to horizontal lines of the original video image or vertical lines of the intermediate video image, and the contraction rates are provided to allow the contraction of the shape and size of the original video image or the contraction of the shape and size of the intermediate video image;

parameter storing means which provides a parameter table to store the transformation parameters which are calculated by the calculation means with respect to each of the scanning lines of the first axis direction and each of the scanning lines of the second axis direction;

first video transformation process means for executing the transformation process of the first axis direction, wherein read addresses for the first video storing means are created by performing accumulative addition and subtraction on the transformation parameters with respect to each of the scanning lines of the first axis direction, so that video data representing the original video image are read from the first video storing means in accordance with the read addresses and are sequentially written into the second video storing means; and second video transformation process means for executing the transformation process of the second axis direction, wherein read addresses for the second video storing means are created by performing accumulative addition and subtraction on the transformation parameters with respect to each of the scanning lines of the second axis direction, so that video data representing the intermediate video image are read from the second video storing means and are sequentially output.

8. A two-dimensional spatial transformation system according to claim 7 wherein the second video storing means is a video memory of a double-buffer configuration, which provides real-time reading of a transformed video image by writing the intermediate video image into a first bank of the second video storing means while simultaneously reading the intermediate video image from a second bank of the second video storing means.

9. A two-dimensional spatial transformation system according to claim 7 further comprising a transformation table which imparts a special visual effect on a transformed video image by subjecting the read addresses for the first video storing means, which are created by the first video transformation process means, to coordinates conversion with regard to at least one of the first axis direction and the second axis direction.

10. A two-dimensional spatial transformation system according to claim 7 further comprising border area process means which detects a border area of a transformed video image on the basis of the read addresses for the first and second video storing means so that a predetermined area color is implanted in the border area.

11. A two-dimensional spatial transformation system according to claim 7 further comprising border area process means which detects a border area of a transformed video image on the basis of the read addresses for the first and second video storing means so that a predetermined area color is implanted in the border area, wherein the border area process means has a function to designate addresses defining a storage area of the area color within at least the first video storing means.

12. A two-dimensional spatial transformation system according to claim 7 wherein the first video storing means stores parts of an original video image representing an object to be displayed, the parameter storing means stores transformation parameters with respect to each of the parts, the first and second video transformation process means perform the transformation processes on the parts respectively on the basis of the transformation parameters so that transformed parts are subjected to video composition on the second video storing means.

13. A two-dimensional spatial transformation system employing a two-pass method comprising:

first video memory means containing three memories having functions which are sequentially implemented in accordance with cycles which are determined in advance, wherein video representing an original video image are input to the first video memory means;

second video storing means;

transformation table means for storing transformation parameters containing offset values and contraction rates which are provided for a first pass transformation and a second pass transformation, respectively;

first pass transformation means for performing first pass transformation based on the transformation parameters of the first pass transformation with respect to the video data of the original video image on the first video memory means to produce video data representing an intermediate video image, wherein the offset values for the first pass transformation are provided to indicate positions to start plotting of pixels corresponding to horizontal lines of the original video image, and the contraction rates for the first pass transformation are provided to allow the contraction of the shape and size of the original video image; and second pass transformation means for performing second pass transformation based on the transformation parameters of the second pass transformation with respect to the video data of the intermediate video image on the second video memory means to produce video data representing a transformed video image, wherein the offset values for the second pass transformation are provided to indicate positions to start plotting of pixels corresponding to vertical lines of the intermediate video image, and the contraction rates for the second pass transformation are provided to allow the contraction of the shape and size of the intermediate video image.

14. A two-dimensional spatial transformation system according to claim 13 wherein each of the cycles corresponds to a frame or a field.

15. A two-dimensional spatial transformation system according to claim 13 wherein the first pass transformation is transformation of a horizontal direction on a screen of a display so that the original video image is transformed in the horizontal direction, whilst the second pass transformation is transformation of a vertical direction so that the intermediate video image is transformed in the vertical direction.

16. A two-dimensional spatial transformation system according to claim 13 wherein the transformation parameters contain an offset value and a contraction rate, so that transformation of a video image is made by shifting a display location of the video image by the offset value in a predetermined direction on a screen of a display and by also contracting shape and size of the video image in accordance with the contraction rate in the predetermined direction.

17. A two-dimensional spatial transformation system according to claim 13 further comprising a border area detector for detecting a border area which is placed outside of a range of a video image on a screen of a display, so that an area color is implanted in the border area.

18. A two-dimensional spatial transformation system according to claim 13 wherein the first video memory means is configured by a DRAM while the second video memory means is configured by a SRAM.

19. A two-dimensional spatial transformation system employing a two-pass method comprising:

a first video memory having a double-buffer configuration to which video data representing an original video image are input, wherein a first bank of the first video memory stores video data of a current frame or a current field while a second bank of the first video memory stores video data of a previous frame or a previous field;

a second video memory having a double-buffer configuration to which an output of the first video memory is transferred;

an output buffer having a double-buffer configuration to which an output of the second video memory is transferred;

first pass transformation means for performing a first pass transformation based on first pass transformation parameters, containing offset values and contraction rates, with respect to the original video image on the first video memory, thus producing video data representing an intermediate video image which are transferred to the second video memory, wherein the offset values for the first pass transformation are provided to indicate positions to start plotting of pixels corresponding to horizontal lines of the original video image, and the contraction rates for the first pass transformation are provided to allow the contraction of the shape and size of the original video image; and second pass transformation means for performing a second pass transformation based on second pass transformation parameters with respect to the intermediate video image on the second video memory, thus producing video data representing a transformed video image which are transferred to the output buffer, wherein the offset values for the second pass transformation are provided to indicate positions to start plotting of pixels corresponding to vertical lines of the intermediate video image, and the contraction rates for the second pass transformation are provided to allow the contraction of the shape and size of the intermediate video image.

20. A two-dimensional spatial transformation system according to claim 19 further comprising read address changing means for changing a read address to read the video data from the first video memory to provide a pseudo perspective effect.

21. A two-dimensional spatial transformation system according to claim 19 further comprising read address changing means for changing a read address to read the video data from the output buffer to provide a rotation of the transformed video image by an angle of rotation on a screen of a display.

22. A two-dimensional spatial transformation system according to claim 19 wherein a storage area of the first video memory is divided into two areas which store luminance data and color data respectively while a storage area of the second video memory is divided into two areas which store luminance data and color data respectively.

23. A two-dimensional spatial transformation system comprising:

a parts video memory for storing video data representing parts of an original video image to be animate on a screen of a display;

transformation means for performing two-dimensional spatial transformation based on transformation parameters, including offset values and contraction rates, with respect to the parts of the original video image to produce parts of a transformed video image respectively, wherein the offset values are first provided to indicate positions to start plotting of pixels corresponding to horizontal lines of parts of the original video image, and then provided to indicate positions to start plotting of pixels corresponding to vertical lines of parts of the transformed video image with respect to the spatial transformation, and the contraction rates are provided to allow the contraction of the shape and size of video images with respect to the spatial transformation; and a composite video memory on which video composition is performed on the parts of the transformed video image so as to produce a composite video image which is outputted as an animated video image, wherein the composite video memory has a double-buffer configuration consisting of two banks which are changed over by each frame or by each field.

24. A two-dimensional spatial transformation system according to claim 23 further comprising means for detecting a background color, which is implanted in a border area of the original video image in advance, from an output of the parts video memory, so that overwriting of the background color is avoided on the composite video memory.

25. A two-dimensioal spatial transformation system according to claim 23 wherein the video composition is carried out such that a part having a low priority order is written into the composite video memory earilier while a part having a high priority order is written into the composite video memory later.

26. A computer-readable media storing programs and parameters which cause a video processing system to execute a two-dimensional spatial transformation method comprising the steps of:

performing a first pass transformation on an original video image in a first direction to produce an intermediate video image, wherein a display location of the original video image is shifted by an offset value in the first direction while the original video image is contracted by a contraction rate in the first direction, the offset values for the first pass transformation being provided to indicate positions to start plotting of pixels corresponding to horizontal lines of the original video image and the contraction rates for the first pass transformation being provided to allow the contraction of the shape and size of the original video image; and performing a second pass transformation on an intermediate video image in a second direction perpendicular to the first direction so as to produce a transformed video image, wherein a display location of the intermediate video image is shifted by an offset value in the second direction while the intermediate video image is contracted by a contraction rate in the second direction, the offset values for the second pass transformation being provided to indicate positions to start plotting of pixels corresponding to vertical lines of the intermediate video image and the contraction rates for the second pass transformation being provided to allow the contraction of the shape and size of the intermediate video image.

27. A computer-readable media according to claim 26 wherein the two-dimensional spatial transformation method further comprising the steps of:

detecting a border area which is placed outside of a range of a video image; and implanting an area color in the border area on a screen of a display.

28. The system according to claim 1, wherein the first memory device is a dynamic random access memory (DRAM) and the second memory device is a static random access memory (SRAM).

29. The system according to claim 1, wherein the transformation process of the horizontal direction is performed after the transformation process of the vertical direction.

30. The method according to claim 5, wherein executing the transformation process of the first axis direction is performed after executing the transformation process of the second axis direction.

31. The system according to claim 7, wherein the first video transformation process means executes the transformation process of the first axis direction after the second video transformation process means executes the transformation process of the second axis direction.

32. The system according to claim 13, wherein the first pass transformation means performs the first pass transformation after the second pass transformation means performs the second pass transformation.

33. The system according to claim 19, wherein the first pass transformation means performs the first pass transformation after the second pass transformation means performs the second pass transformation.

34. The system according to claim 23, wherein the offset values are first provided to indicate positions to start plotting of pixels corresponding to vertical lines of parts of the original video image, and then provided to indicate positions to start plotting of pixels corresponding to horizontal lines of parts of the transformed video image with respect to the spatial transformation.

35. The system according to claim 26, wherein the offset values for the first pass transformation are being provided to indicate positions to start plotting of pixels corresponding to vertical lines of the original video image and the contraction rates for the first pass transformation are being provided to allow the contraction of the shape and size of the original video image, and the offset values for the second pass transformation are being provided to indicate positions to start plotting of pixels corresponding to horizontal lines of the intermediate video image and the contraction rates for the second pass transformation are being provided to allow the contraction of the shape and size of the intermediate video image.

36. A two-dimensional spatial transformation system wherein a two-dimensional spatial transformation of an original video image onto a two-dimensional space is divided into a transformation process of a horizontal direction and a transformation process of a vertical direction so that the transformation processes are sequentially executed, the two-dimensional spatial transformation system comprising:

- a first video storing device for storing video data representing the original video image, wherein the first video storing device is configured by a first memory device which is accessed in the horizontal direction by a high-speed page mode; and
- a second video storing device for storing the video transferred thereto from the first video storing device, wherein the second video storing device is accessed to execute the transformation process of the vertical direction and is configured by a second memory device for storing at least video data which are provided before and after the transformation process of the vertical direction,
- wherein the transformation process of the horizontal direction is based on transformation parameters including offset values and contraction rates for the transformation process of the horizontal direction, the offset values being provided to indicate positions to start plotting of pixels corresponding to horizontal lines of the original video image and the contraction rates being provided to allow the contraction of the shape and size of the original video image, and
- the transformation process of the vertical direction is based on transformation parameters including offset values and contraction rates for the transformation process of the vertical direction, the offset values being provided to indicate positions to start plotting of pixels corresponding to vertical lines of the video image after the transformation process of the horizontal direction and the contraction rates being provided to allow the contraction of the shape and size of the video image after the transformation process of the horizontal direction.

37. A two-dimensional spatial transformation system wherein a two-dimensional spatial transformation of an original video image onto a two-dimensional space is divided into a transformation process of a first axis direction and a transformation process of a second axis direction perpendicular to the first axis direction so that the transformation processes are sequentially executed, the two-dimensional spatial transformation system comprising:

- a first video storing device for storing the original video image;
- a second video storing device for storing an intermediate video image which is produced by performing the transformation process of the first axis direction on the original video image stored in the first video storing device;
- a calculation device for calculating transformation parameters, wherein the transformation parameters contain offset values and contraction rates which are calculated with regard to each of scanning lines for the transformation process of the first axis direction to transform the original video image onto the two-dimensional space as well as offset values and contraction rates which are calculated with regard to each of scanning lines for the transformation process of the second axis direction to transform the intermediate video image onto the two-dimensional space, wherein the offset values are provided to indicate positions to start plotting of pixels corresponding to horizontal lines of the original video image or vertical lines of the intermediate video image, and the contraction rates are provided to allow the contraction of the shape and size of the original video image or the contraction of the shape and size of the intermediate video image;
- a parameter storing device which provides a parameter table to store the transformation parameters which are calculated by the calculation device with respect to each of the scanning lines of the first axis direction and each of the scanning lines of the second axis direction;
- a first video transformation process device for executing the transformation process of the first axis direction, wherein read addresses for the first video storing device are created by performing accumulative addition and subtraction on the transformation parameters with respect to each of the scanning lines of the first axis direction, so that video data representing the original video image are read from the first video storing device in accordance with the read addresses and are sequentially written into the second video storing device; and
- a second video transformation process device for executing the transformation process of the second axis direction, wherein read addresses for the second video storing device are created by performing accumulative addition and subtraction on the transformation parameters with respect to each of the scanning lines of the second axis direction, so that video data representing the intermediate video image are read from the second video storing device and are sequentially output.

38. A two-dimensional spatial transformation system employing a two-pass method comprising:

- a first video memory device containing three memories having functions which are sequentially implemented in accordance with cycles which are determined in advance, wherein video representing an original video image are input to the first video memory device;
- a second video storing device;
- a transformation table device for storing transformation parameters containing offset values and contraction rates which are provided for a first pass transformation and a second pass transformation, respectively;
- a first pass transformation device for performing first pass transformation based on the transformation parameters of the first pass transformation with respect to the video data of the original video image on the first video memory device to produce video data representing an intermediate video image, wherein the offset values for the first pass transformation are provided to indicate positions to start plotting of pixels corresponding to horizontal lines of the original video image, and the contraction rates for the first pass transformation are provided to allow the contraction of the shape and size of the original video image; and a second pass transformation device for performing second pass transformation based on the transformation parameters of the second pass transformation with respect to the video data of the intermediate video image on the second video memory device to produce video data representing a transformed video image, wherein the offset values for the second pass transformation are provided to indicate positions to start plotting of pixels corresponding to vertical lines of the intermediate video image, and the contraction rates for the second pass transformation are provided to allow the contraction of the shape and size of the intermediate video image.

39. A two-dimensional spatial transformation system comprising:

a parts video memory for storing video data representing parts of an original video image to be animate on a screen of a display;

a transformation device for performing two-dimensional spatial transformation based on transformation parameters, including offset values and contraction rates, with respect to the parts of the original video image to produce parts of a transformed video image respectively, wherein the offset values are first provided to indicate positions to start plotting of pixels corresponding to horizontal lines of parts of the original video image, and then provided to indicate positions to start plotting of pixels corresponding to vertical lines of parts of the transformed video image with respect to the spatial transformation, and the contraction rates are provided to allow the contraction of the shape and size of video images with respect to the spatial transformation; and a composite video memory on which video composition is performed on the parts of the transformed video image so as to produce a composite video image which is outputted as an animated video image, wherein the composite video memory has a double-buffer configuration consisting of two banks which are changed over by each frame or by each field.

* * * * *